(12) United States Patent
Hirashima et al.

(10) Patent No.: US 6,301,589 B1
(45) Date of Patent: Oct. 9, 2001

(54) REPLICATION METHOD

(75) Inventors: Yoko Hirashima; Satoshi Kikuchi; Hitoshi Yui, all of Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/203,570

(22) Filed: Dec. 2, 1998

(30) Foreign Application Priority Data

Dec. 4, 1997 (JP) .................................................. 9-334333

(51) Int. Cl.[7] .............................. G06F 12/00; G06F 17/30
(52) U.S. Cl. .............................. 707/204; 707/8; 707/104; 707/200; 907/200; 907/201; 907/223; 379/34
(58) Field of Search ......................... 707/204, 201, 707/202, 203, 8, 104, 200; 709/217, 218, 203; 909/200, 201, 223; 379/34

(56) References Cited

U.S. PATENT DOCUMENTS

| | | | |
|---|---|---|---|
| 5,765,171 | * 6/1998 | Gehani et al. | 707/203 |
| 5,956,489 | * 9/1999 | San Andres et al. | 395/200.51 |
| 5,974,563 | * 10/1999 | Beeler, Jr. | 714/5 |
| 5,978,813 | * 11/1999 | Foltz et al. | 395/200.09 |
| 6,049,809 | * 4/2000 | Raman et al. | 707/203 |
| 6,097,882 | * 8/2000 | Mogul | 395/200.31 |

FOREIGN PATENT DOCUMENTS 6-139126    5/1994   (JP) .

OTHER PUBLICATIONS

"The Slapd and Slurpd Administrator's Guide" Apr. 30, 1996; Release 3.3 University of Michigan.

* cited by examiner

*Primary Examiner*—Thomas Black
*Assistant Examiner*—Jacques Veillard
(74) *Attorney, Agent, or Firm*—Antonelli, Terry, Stout & Kraus, LLP

(57) ABSTRACT

A directory system for performing replication of directory data, in which a directory server on the consumer side can reconstruct replica data using a backup kept at any point in time. Information 10c for specifying the entry changed for the last time by replication performed by replication service 10' is recorded into the replica data 9c managed by the directory server on the consumer side. Based on this information, the replication service 10' can know the entry on which next replication is to be performed. Thus, the replication service 10' can recognize the difference between the master data 9s managed by the directory server on the supplier side and the replica data 9c, and can perform replication on this difference when only the replica data 9c is reconstructed using the backup.

14 Claims, 20 Drawing Sheets

REPLICATION DEFINITION FILE

CHANGE LOG FILE (REPLICATION RECORD)

FIG. 10
serverApplicationProcess OBJECT-CLASS::=
    SUBCLASS OF {dSA}
    MUST CONTAIN {ipAddress, hostName}
}
directory Server OBJECT-CLASS::=
    SUBCLASS OF {serverApplicationProcess}
    MAY CONTAIN {lastReplRecord}
}    101
FIG. 11
110 lastReplRecord ATTRIBUTE VALUE
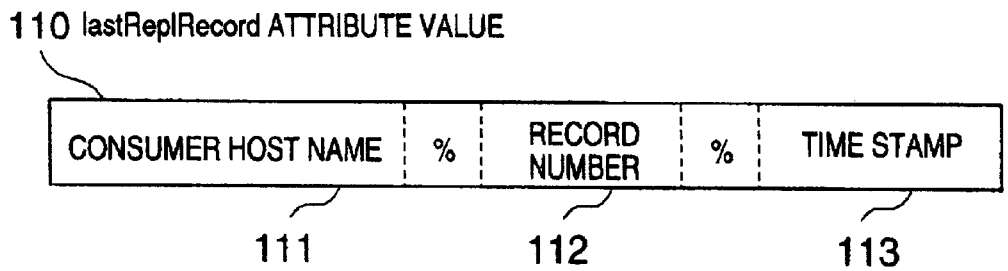
111    112    113
FIG. 12
120 REPLICATION STATE FILE
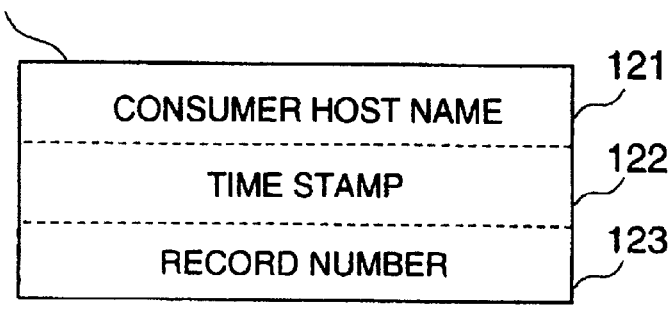

FIG. 13

| UPDATE TYPE OPERATION | | RETURN CODES BELONG TO GROUP 1 |
|---|---|---|
| ENTRY ADDITION | | LDAP_ALREADY_EXISTS |
| ENTRY DELETION | | LDAP_NO_SUCH_OBJECT |
| CHANGE OF ENTRY ATTRIBUTE VALUE | ADDITION | LDAP_TYPE_OR_VALUE_EXISTS |
| | DELETION | LDAP_NO_SUCH_ATTRIBUTE |
| RDN CHANGE | | LDAP_NO_SUCH_OBJECT |

FIG. 14

| RETURN CODE BELONGS TO GROUP 2 |
|---|
| LDAP_SUCCESS |

FIG. 20

```
LADPMessage::=SEQUENCE{
         messag ID              messag ID
2001    protocolOp              CHOICE {
2002        bind Request            Bind Request,
            bind Response           Bind Response,
            unbind Request          Unbind Request,
            search Request          Search Request,
            searchResEntry          SearchResultEntry,
            searchResDone           SearchResultDone,
            searchResRef            SearchResultReference,
            modifyRequest           ModifyRequest,
            modifyResponse          ModifyResponse,
            add Request             Add Request,
            add Response            Add Response,
                  ⋮                       ⋮
            delRequest              DelRequest,
2003        delResponse             DelResponse},
         controls               [0]Controls OPTIONAL}
```

FIG. 21

```
Controls::=SEQUENCE of SEQUENCE {
         control Type           LDAPOID
2101     criticality            BOOLEAN DEFAULT FALSE,
2102     control Value          OCTET STRING OPTIONAL}
2103
```

```
Control::=SEQUENCE{
         control Type      <repOid>
2201     criticality       TRUE,
2202     control Value     <lastReplRecord>
2203
```

REPLICATION METHOD

BACKGROUND OF THE INVENTION

1. Field of the Invention

The present invention relates to a technique which can improve operability in managing a replica of directory data.

2. Related Art Statement

It is now often the case that, in an OA (Office Automation) environment, such as an in-house information system, in which a number of independent systems such as a mail system, a file sharing system etc. are intermixed, a user has plural items of user identifying information such as mail addresses, login names, passwords, etc. Accordingly, with increase or decrease of users, an administrator must add or eliminate each item of the user identifying information used in respective systems, which imposes a heavier burden on the management.

Thus, it is desired to lighten the administrator's management burden by employing a directory system which can perform directory services for administering items of user identifying information used in a plurality of systems and items of information existing on apparatuses and resources in a unified manner. By applying such a directory system, it will be possible to search for information desired by a user and provide it.

Heretofore, such a thus-described in-house information system has been constructed separately for each small department. However, in-house information systems different for respective departments can not smoothly perform procedures relating to movements of personnel or mail exchanges between departments. Thus, construction of a large-scale wider area in-house information system unified for the whole company is rapidly advanced.

As such a large-scale wider area in-house information system develops, it is desired for a directory system to maintain access performance irrespective of the scale of the system. In addition, from the viewpoint of reliability, multiplexing of the service is required for preventing interruption of the entire service caused by the occurrence of a problem in a single place.

To reply to such a request, it is effective to arrange replicas of directory data in a plurality of places. Hereinafter, a replica of directory data is referred to as "replica data", and replicating directory data is referred to as "replication".

As a standard relating to replication in directory service, there can be mentioned X.500 recommended by CCITT. In X.500, a client/server type distributed system architecture is provided for directory service, and DAP (Directory Access Protocol) is provided as a protocol for accessing a directory among clients and servers.

Concerning replication, a directory server that manages original directory data (master data) of a replication source and supply directory data to be replicated is defined as a supplier side, and a directory server that manages replica data and receives the directory data to be replicated is defined as a consumer side. Further, DSP (Directory Information Shadowing Protocol) is provided as a replication protocol between a directory server on the supplier side and a directory server on the consumer side.

As an operation model, there are a "push" model in which replication is started up by a directory server on the supplier side, and a "pull" model in which replication is started up when a directory server on the consumer side requests data.

On the other hand, IETF (Internet Engineering Task Force) employed LDAP (Light Weight Directory Access Protocol) (RFC1777) which operates on a TCP/IP stack as a standard protocol for directory access.

Now, conventional replication using LDAP as a replication protocol will be described.

In the following, a directory server that manages master data is called a "supplier directory server", and a directory server that manages replica data is called a "consumer directory server". Further, a server that propagates a modify operation performed in the supplier directory server to a consumer directory server is called "replication server".

As a directory access request in LDAP, there are a reference type directory access request that does not change directory data and an update type directory access request that makes change in directory access data. As the reference type directory access request, there exists only a search request. As the update type directory access request, there are an entry addition request, an entry deletion request, and an RDN change request.

When the supplier directory server succeeds in a modify operation in accordance with an update type directory access request, it adds a time stamp to replication log of this modify operation, and stores it as a replication record in a replication log file. Such time stamps are used for identifying the order in which replication records were stored, i.e., the order in which modify operations according to respective update type directory access requests were performed.

In the conventional replication server, when replication is to be performed, replication records are first acquired from the replication log file in such an order that time stamps are not decreased. Then, based on the acquired replication records, update type directory access requests (LDAP access requests) are prepared, and the prepared LDAP access requests are issued to a consumer directory server.

As a result, that consumer directory server can perform modify operations in accordance with the same update type directory access requests in the same order as the update type directory access requests which caused the changes performed in the supplier directory server.

However, since, as described above, the replication server only propagates modify operations, an administrator of the consumer directory server must prepare a replica of the master data as replica data before the replication is started.

Operation of the replication is a "push" model when the replication server starts replication in accordance with output of replication records by the supplier directory server, and a "pull" model when replication is started in accordance with a state of the consumer directory server.

In the present description, replication in a "push" model is assumed.

Further, a time stamp is a numerical value based on a time point when the supplier directory server receives an update type directory access request, on a time point of a modify operation, or on a time point when a replication record is stored into the replication log file. Time stamps should be arranged in ascending order of performing modify operations.

FIG. 3 shows a replication sequence performed by the conventional replication server.

As shown in FIG. 3, the conventional replication server reads out a replication record (31) from the replication log file.

Successively, the replication server issues a bind request (32) to a consumer directory server, and receives a response (33) to it, which establishes a connection with the consumer directory server.

Successively, the replication server prepares an LDAP access request (34) based on the replication record (31) read out. In the following description, such an LDAP access request is called a "replication request".

Then, the replication server issues the prepared replication request (34) to the consumer directory server, and receives a response (35) to it. When a return code included in this response (35) is "LDAP_SUCCESS" indicating success of the replication, the replication server records a replication status (37). Here, the time stamp of the successful replication record is stored into a replication status file.

The replication server always reads out the replication record having the oldest time stamp among replication records having time stamps subsequent to one stored in the replication status file, so that it can perform replication in the same order as the modify operations were performed by the supplier directory server.

Thereafter, the replication server issues an unbind request (38) to cut off the connection with the consumer directory server.

According to the above-described sequence, it is possible that the consumer directory server performs the same modify operations in the same order as ones performed in the supplier directory server. Thus, the replica data managed by the consumer directory server can be made identical to the master data managed by the supplier directory server.

As an example of a server program for implementing such a sequence as described above, a replication service program "slurpd" developed by Michigan University is provided free on the Internet.

SUMMARY OF THE INVENTION

In the above-described conventional technique, when replica data managed by a consumer directory server has been lost owing to, for example, physical damage of a magnetic disk, or the like, a copy of the master data managed by the supplier directory server located in a geographically distant place must be obtained to reconstruct the replica data. Thus, it requires the effort of an administrator, and takes time for recovery.

Even if a backup of the replica data has been kept, it is impossible to reconstruct the replica data using that backup data. That is, since it is unknown that up to which replication record the backup data are reflecting replication records, the replication server can not restart the replication for the backup data. In that case, in the replication server, the time stamp stored in the replication status file is a value at the time damage occurred, and it does not necessarily correspond to the backup data.

Thus, in the conventional technique, the replication server can not recognize the difference between the master data and backup data, and accordingly, it can not perform replication for the backup data at the time of reconstruction of the replica data.

Further, in the conventional technique, in a case where replication ends abnormally owing to such a problem as power supply interruption between issuance of a replication request and receipt of a response to it, the replication server can not receive the response from the consumer directory server. As a result, a time stamp of a replication record in the last successful replication is not recorded.

For this reason, after recovery from a problem, to restart the replication, the replication server issues an identical replication request to the one issued in the replication of the last session. Accordingly, if the consumer directory server has succeeded in the modify operation according to the replication request issued in the replication of the last session, the same replication request is issued repeatedly, and the modify operation according to this replication request results in failure. In such a case, the replication server ends abnormally, and the administrator must perform a recovery operation manually.

Thus, a first object of the present invention is to realize replication which may be restarted for a backup of replica data even if that replica data has been lost, and improved its operability.

Further, a second object of the present invention is to realize replication which may be restarted normally after recovery from the trouble and improved its operability, even if replication is interrupted owing to an unexpected problem at any time point.

To attain the above-mentioned first object, the present invention provides, as its first aspect, a replication tool for keeping contents of master data and contents of replica data in a directory system, in which, a first directory server manages the master data of directory data and records and holds replication log of operations in changing the master data; one or more second directory servers each manages their replica data as a replica of the master data; and the first directory server and the one or more second directory servers are connected at least through a network, the replication tool being installed in one (hereinafter, referred to as "replication server") of the first directory server and another server connected to the network, wherein:

the replication server comprises:

replication log acquiring means for acquiring a replication log which becomes an object of processing out of the replication log recorded and held by the first directory server;

replication request issuing means for issuing a directory access request (hereinafter, referred to as "replication request") that requests performing, on the replica data, the same operations as operations corresponding to the history operation acquired by the replication log acquiring means, to the second directory server; and identifying information recording means for recording an identifying information for specifying the replication log corresponding to the operations performed by the second directory server, into the replica data managed by the second directory server, when the operation performed in accordance with the replication request issued by the replication request issuing means are successful, and the replication log acquiring means refers to the identifying information recorded in the replica data managed by the second directory server to decide a replication log to be acquired.

According to the first aspect of the present invention, the identifying information recorded in the replica data managed by the second directory server specifies the entry changed for the last time by the operation of the second directory server in accordance with the replication request (the entry changed by replication for the last time). Thus, by referring to this identifying information, the replication server can know the entry on which next replication is to be performed, and accordingly, can recognize difference of the master data managed by the first directory server with the replica data managed by the second directory server.

Thus, by keeping a backup of the replica data including this identifying information, it is possible for the second directory server to reconstruct the replica data using the backup, without acquiring all the entries in the master data, even when the replica data has been lost owing to, for example, physical damage of a recording medium, and thus improve its operability.

Namely, according to first aspect of the invention, even when the replica data has been lost, it is possible to restart replication for the backup of the replica data, thus realizing the replication with improved operability.

In a case where, in the first aspect of the invention, the replication log includes order information indicating the order of execution of corresponding operations, the identifying information recording means may employ the order information as the identifying information to be recorded. Also, the replication log acquiring means may decide, as the replication log to be acquired, a replication log including order information which indicate the earliest execution order out of replication log including order information indicating an execution order later than the execution order indicated by the order information included in the identifying information referred to.

Further, the present invention provides, as a second aspect, a replication tool, characterized in that, in the first aspect of the present invention, the replication log acquiring means issues a directory access request that requests performing an operation of searching the identifying information, to the second directory server, so as to refer to the identifying information recorded in the replica data managed by the second directory server.

According to the second aspect, the identifying information can be treated as contents set in one entry within the replica data. Thus, the second directory server can perform the operation of searching the identifying information similar to the search operation in accordance with above-described reference type directory access request, and operations of the second directory server may be similar to the conventional one.

Further, the present invention provides, as a third aspect, a replication tool characterized in that, in one of the first and second aspects of the invention, the identifying information recording means issues a directory access request that requests performing an operation of recording the identifying information, to the second directory server, so as to record the identifying information into the replica data managed by the second directory server.

According to the third aspect, the identifying information can be treated as contents set in one entry within the replica data. Thus, the second directory server may perform an operation of recording the identifying information similar to a modify operation in accordance with the reference type directory access request, and operation of the second directory server may be similar to the conventional one.

Further, the present invention provides, as a fourth aspect, a replication tool characterized in that, in one of the first through third aspects of the invention, the replication server further comprises:

an error judgment means that operates in such a manner that, even when the operations performed by the second directory server in accordance with the replication request issued by the replication request issuing means result in failure, the error judgment means judges the failure as success if the failure is caused by issuing the same replication request as the replication request successively more than twice, and the second servers previously received the same replication request as the replication request.

For example, in a case where a problem happens after success of the operation performed by the second directory server in accordance with a replication request and the replication is interrupted, recording of the identifying information results in failure. Then, after recovery from the problem, and when the replication server restarts the replication, it refers to unchanged false identifying information to issue a replication request. Also, an operation performed by the second directory server in accordance with this replication request results in failure.

However, according to the fourth aspect of the present invention, the replication server may be able to evaluate such an operation as success, and it is possible to maintain the replica data correctly and to continue the replication.

Further, the present invention provides, as a fifth aspect, a replication tool characterized in that, in one of the first and second aspects of the invention, when said second directory server is a directory server that can perform a predefined specific operation in accordance with contents set into a predefined specific field within a directory access request received, said identifying information recording means sets, into said specific field of said replication request issued by said replication request issuing means, information necessary for said second directory server to perform a specific operation of recording said identifying information, so that said identifying information is recorded into the replica data managed by said second directory server.

According to the fifth aspect, in addition to the effect of the third aspect, it is possible that said second directory server can perform an operation of recording said identifying information in one issue of a replication request. Thus, except for a replication request, the replication server need not issue a directory access request for requesting an operation of recording said identifying information, which suppress increase of network traffic.

Further, to attain the above-described second object, it is necessary to solve the following problem. Namely, in a case where a problem happens before the replication server knows if an operation performed by said second directory server in accordance with an issued replication request has been successful or not, and the replication is interrupted, the replication may not be restarted normally after recovery from the problem.

Accordingly, to solve the problem, in the present invention, in one of the third and fifth aspects of the invention, said second directory server performs an operation according to said replication request and an operation of recording said identifying information, in the same single transaction.

As a result, consistency of the replica data with the identifying information can be assured, and the above-described second object is attained.

BRIEF DESCRIPTION OF THE DRAWINGS

FIG. 10 is an explanatory view showing subclasses of an object class in the first through third embodiments;

FIG. 11 is an explanatory view showing a format for a value of lastReplRecord attribute value, which is a replication record identifier in the first through third embodiments;

FIG. 12 is an explanatory view showing information to be stored in a replication status file 21;

FIG. 13 is an explanatory view showing LDAP return codes belonging to Group 1;

FIG. 14 is an explanatory view showing LDAP return code belonging to Group 2;

FIG. 20 is an explanatory view showing a notation of an LDAP access request defined in LDAP;

FIG. 21 is an explanatory view showing a notation of Controls defined in LDAP;

DETAILED DESCRIPTION OF PREFERRED EMBODIMENTS

Figure 1:
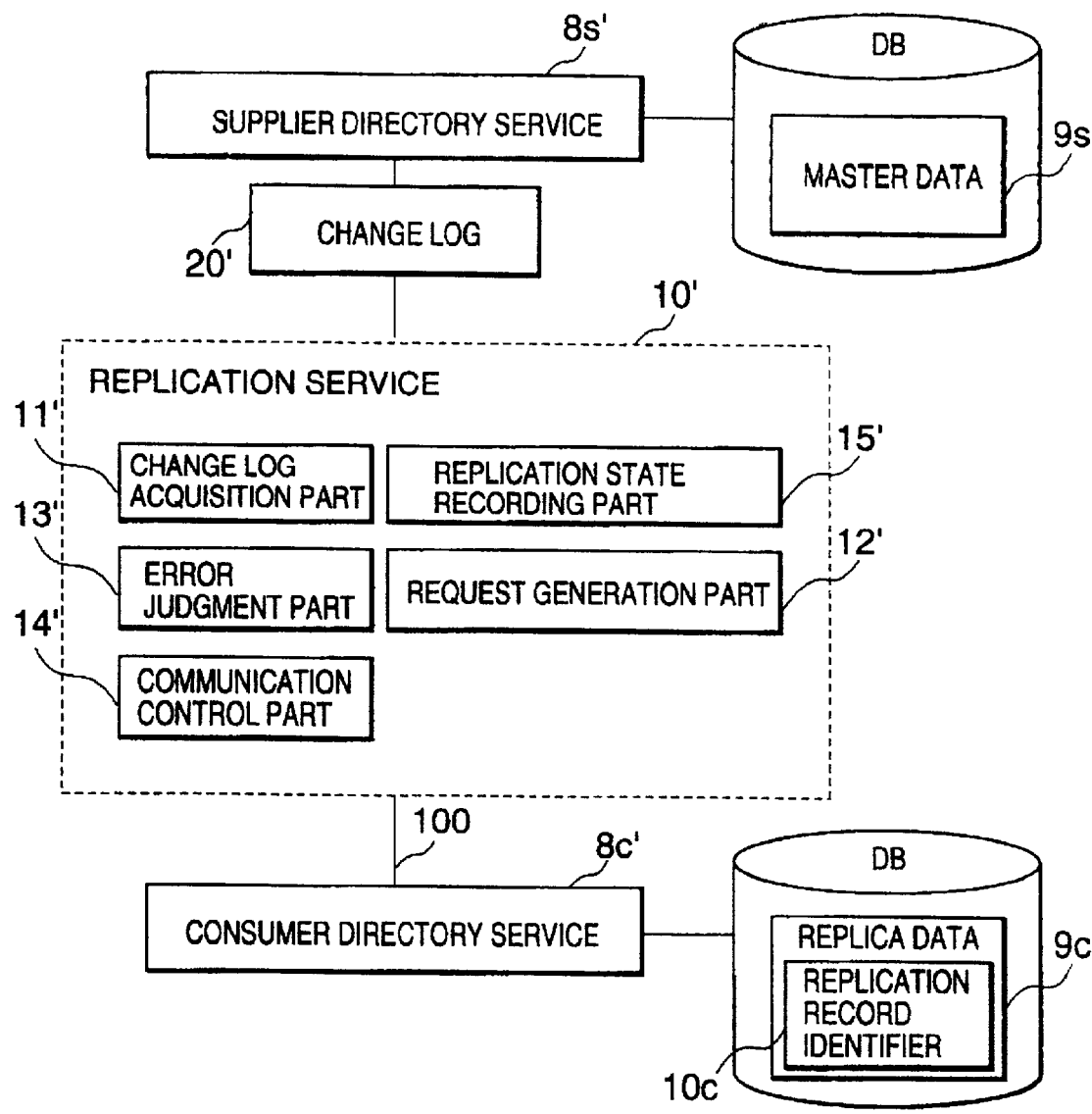
FIG. 1 is an explanatory view showing a functional configuration of replication service according to a first embodiment.

Now, embodiments of the present invention will be described referring to the drawings.

To start with, a first embodiment according to the present invention will be described.

Figure 2:
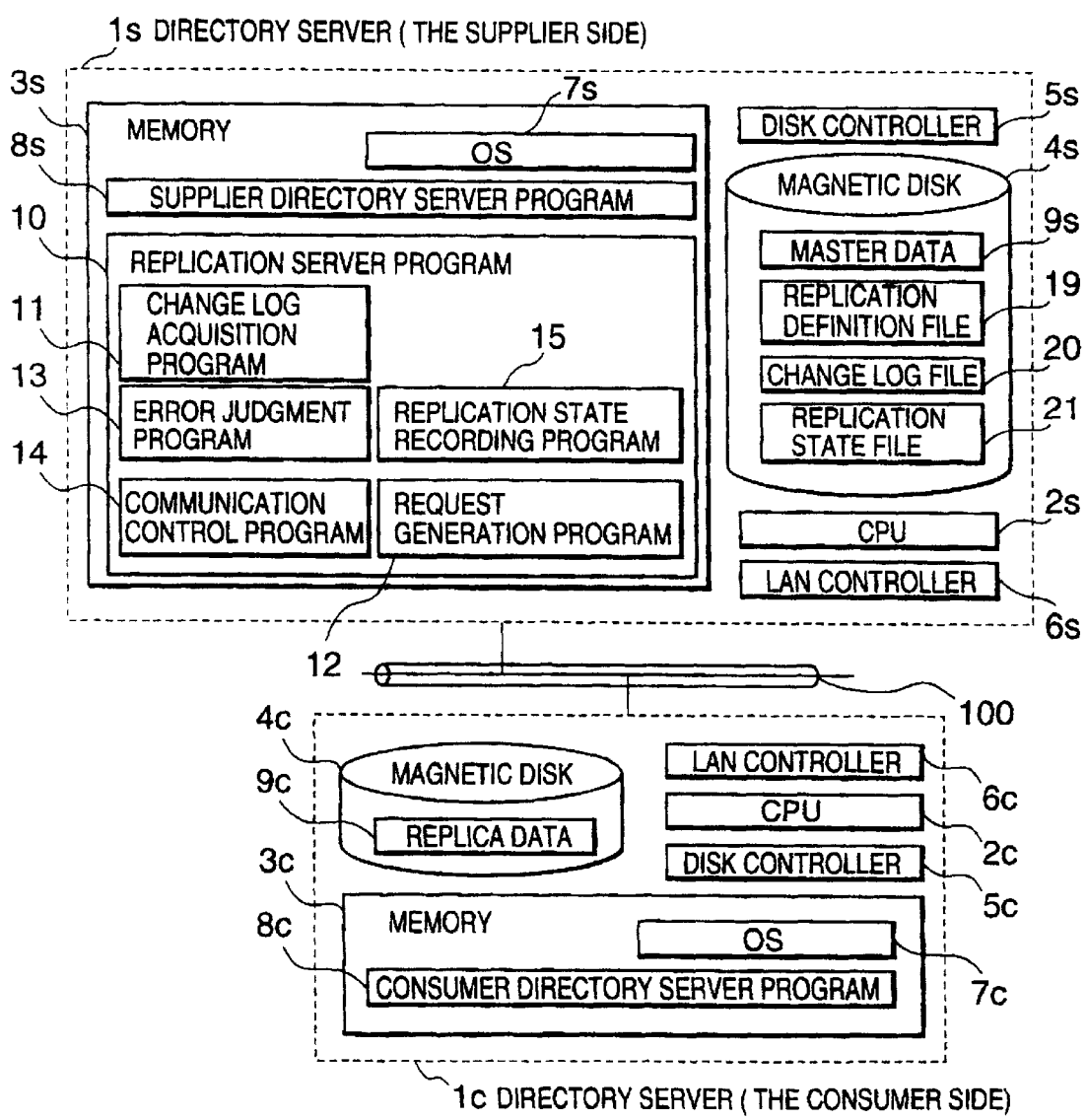
FIG. 2 is an explanatory view showing a system configuration of a directory system according to the first embodiment.
Figure 3:
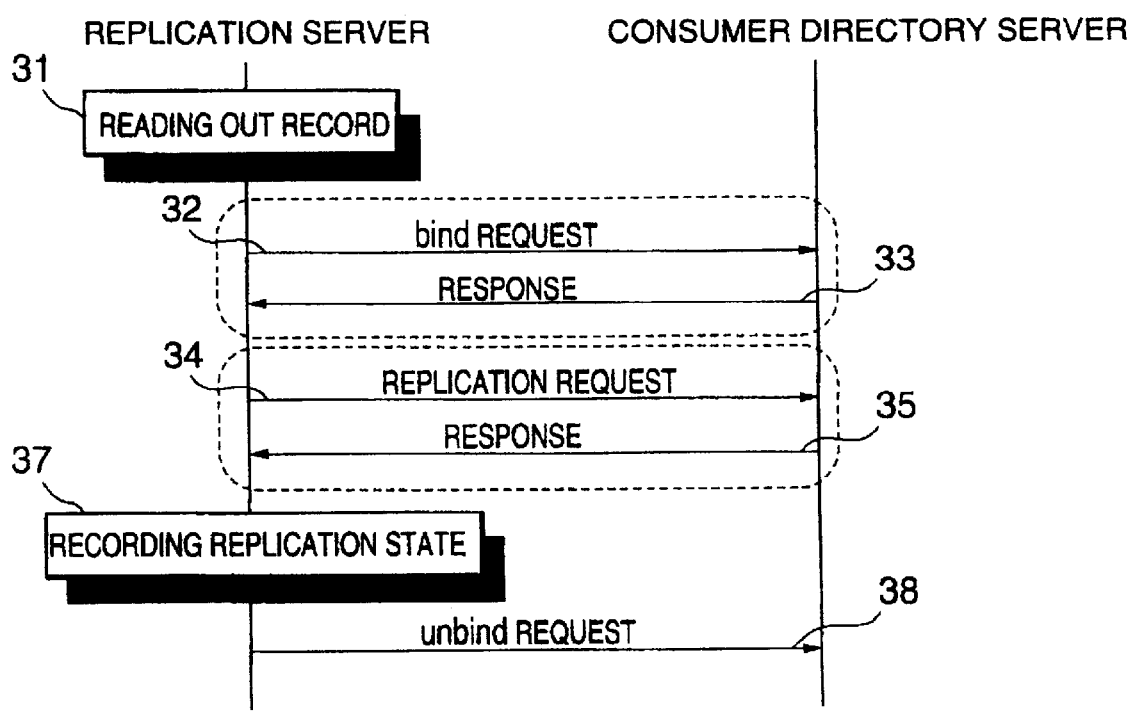
FIG. 3 is an explanatory view showing the sequence of the conventional replication service.

FIG. 2 shows a system configuration of a directory system according to the first embodiment. In the figure, the reference numeral is refers to a first directory server, and $1c$ to a second directory server.

Similarly to the conventional technique, in the first embodiment, a plurality of directory servers (two servers, i.e. the first directory server $1s$ and the second directory server $1c$) are provided for maintaining access performance and for improving reliability. The first directory server $1s$ is on the supplier side and issues a replication request to the second directory server $1c$ on the consumer side when directory data (master data) managed by the first directory server $1s$ itself is changed, so as to perform replication. By this replication, directory data (replica data) managed by the second directory server $1c$ is changed to have the same contents as the master data. Here, in the first embodiment, the first directory server $1s$ itself operates as a replication server that performs replication.

Differing from the conventional technique, a backup of the replica data is kept in the first embodiment. Thus, when the replica data has been lost due to, for example, damage of a recording medium, it is possible to restart the replication for the backup data, and to reconstruct the replica data using the backup data without acquiring all the entries in the master data from the first directory server $1s$, thus improving operability.

Namely, for entries included in the backup, the second directory server $1c$ uses the backup to recover the replica data. Only for entries which are not included in the backup, the first directory server $1s$ restarts the replication to recover the replica data.

To that end, it is necessary that the first directory server $1s$ itself recognizes the difference between the master data managed by itself and the replica data (recovered one using the backup) managed by the directory server $1c$, and perform the replication only for the difference. However, the conventional technique can not recognize such difference.

Accordingly, in the first embodiment, as will be described below, it is made possible for the first directory server $1s$ to recognize entries in the replica data changed for the last time, so as to make it possible to recognize the difference between the master data and the replica data.

Now, referring to FIG. 2 again, the first directory server $1s$ comprises a central processing unit (CPU) $2s$, a memory $3s$, a magnetic disk $4s$, a disk controller $5s$, and a LAN controller $6s$.

At start-up of the first directory server $1s$, CPU $2s$ loads an operating system (OS) $7s$, a supplier directory server program $8s$ for managing the master data $9s$, and a replication server program $10$ for performing replication, from the magnetic disk $4s$ into the memory $3s$ through the disk controller $5s$.

The replication server program $10$ contains, within itself, a change log acquisition program $11$, a request generation program $12$, a replication status recording program $15$, an error judgment program $13$, and a communication control program $14$.

Further, in the magnetic disk $4s$, there exist the replica data $9c$ managed by the supplier directory server program $8s$, a replication definition file $19$, a replication log file $20$, and a replication status file $21$. The replication definition file $19$ stores information necessary for connecting with the consumer directory server program $8c$. Into the replication definition file $19$, there is stored a replication log of a modify operation as a replication record, when the supplier directory server program $8s$ changes the master data $9s$. When the replication server program 10 succeeds in replication, a record identifier indicating a replication record corresponding to a modify operation that caused the replication is stored into the replication status file 21.

On the other hand, the second directory server 1c comprises CPU 2c, a memory 3c, a magnetic disk 4c, a disk controller 5c, and a LAN controller 6c.

At start-up of the second directory server 1c, CPU 2c loads an operating system (OS) 7c, and a consumer directory server program 8c for managing the replica data 9c, from the magnetic disk 4c onto the memory 3c through the disk controller 5c.

Further, in the magnetic disk 4c, there exists the replica data 9c managed by the consumer directory server program 8c.

The first directory server 1s and the second directory server 1c are connected with each other through a local area network (LAN) 100, and communicate with each other through the LAN controllers 6s, 6c.

Each of entries in the master data 9s and the replica data 9c may be made to indicate user identifying information, for example. In that case, a user can search desired user identifying information by issuing a search request (reference type directory access request) from a terminal (not shown) when using the first directory server 1s or the second directory server 1c. Further, a user (especially, an administrator) can change the master data 9s by issuing an update request (update type directory access request) from the terminal they are using to the first directory server 1s. When the master data 9s is changed, the replication server program 10 performs replication to change contents of the replica data 9c to the same contents.

The supplier directory server program 8s and the replication server program 10 may be included in one server program. Otherwise, they may be constructed as independent server programs. In the case of the independently constructed server programs, these server programs 8s, 10 may exist in the same server, or they may exist in different servers respectively.

As shown in FIG. 2, in the first embodiment, the supplier directory server program 8s and the replication server program 10 are independently-constructed server programs, and both exist in the same server (the first directory server 1s). Further, it is assumed that the consumer directory server program 8c exists in another server (the second directory server 1c) different from the server in which two server programs 8s, 10 operate.

In the following figures, the same reference numerals are used to refer to the same parts.

FIG. 1 shows a functional configuration of replication service according to the first embodiment.

In FIG. 1, supplier directory service 8s' and consumer directory service 8c' are functional blocks realized respectively by the supplier directory server program 8s and the consumer directory server program 8c shown in FIG. 2. The supplier directory service 8s' and the consumer directory service 8c' manage the master data 9s and the replica data 9c, respectively.

In particular, in the first embodiment, the replica data 9c managed by the consumer directory service 8c' stores a replication record identifier 10c for specifying the entry in the replica data 9c changed by replication for the last time. In fact, the replication record identifier 10c is set in a predetermined entry as an attribute included in that entry in the replica data managed by the consumer directory service 8c'. In detail, it is set as an attribute value of lastReplRecord attribute of an object class described below referring to FIG. 10.

A change log 20' corresponds to the replication log file 20 shown in FIG. 2. After a record identifier consisting of a time stamp and a record number is added to an update request (update type directory access request) that caused a modify operation by the supplier directory service 8s', the change log 20' stores that update request as replication record. Each of time stamps included in the change log 20' is a number based on a time point when the supplier directory service 8s' received an update type directory access request, performed a modify operation, or stored a replication record in the change log 20'. The time stamps should be arranged in an ascending order of performing modify operations. Further, a record number is a value that is incremented by one at each modify operation.

On the other hand, replication service 10' is a functional block realized by the replication server program 10 shown in FIG. 2. The replication service 10' contains, internally, five functional blocks, i.e., a change log acquisition part 11', a replication status recording part 15', a request generation part 12', an error judgment part 13', and a communication control part 14'. These five functional blocks 11'–15' are realized respectively by the change log acquisition program 11, the replication status recording program 15, the request generation program 12, the error judgment program 13, and the communication control program 14, as shown in FIG. 2.

In the following, these five functional blocks 11'–15' will be described.

The change log acquisition part 11' acquires a replication record from the change log 20', based on the replication record identifier 10c in the replica data 9c. To specify the entry in the replica data 9c changed by replication for the last time, the replication record identifier 10c specifies the replication record corresponding to the modify operation performed when the same entry as the mentioned entry was changed in the master data 9s. The replication record identifier 10c includes time stamp and record number of the replication record in question. Replication is realized by performing, in the same entry in the replica data 9c as a changed entry in the master data 9s, the same modify operation as the one performed when the entry in the master data 9s was changed. Thus, to specify the replication record corresponding to the modify operation performed when the entry in the master data 9s was changed is equivalent to specifying the entry in the replica data 9c changed by the same modify operation as the mentioned modify operation.

Accordingly, from the change log 20', the change log acquisition part 11' searches and reads out replication records having later time stamps and greater record numbers than the time stamp and the record number included in the replication record identifier 10c. The change log acquisition part 11' reads out such records in ascending order of time stamps and record numbers. As a result, the replication service 10' can perform replications in the same order as the modify operations performed by the supplier directory service 8s'.

The request generation part 12' generates a replication request based on the replication record read out by the change log acquisition part 11'.

The communication control part 14' issues the replication request generated by the request generation part 12' to the consumer directory service 8c', and receives corresponding response.

The replication status recording part 15' changes the replication record identifier 10c held by the consumer directory service 8c' so as to indicate the entry in the replica data 9c changed for the last time by replication. Namely, the replication status recording part 15' changes the replication record identifier 10c to include the time stamp and the record number in the replication record that was the base of the issued replication request.

The error judgment part 13' detects a case where, although an entry in the replica data has been changed owing to an already issued replication request, change of the replication identifier 10 has failed, and the replication has resulted in failure, and performs error recovery processing.

FIG. 10 shows directoryServer class and serverApplicationProcess class out of object classes to which entries of the directory data belong.

These object classes are expressed using ASN.1 (Abstract Syntax Notation One) prescribed as ISO8824.

That directory server class is a subclass defined optionally as a subclass of serverApplicationProcess class, and serverApplicationProcess class is a subclass defined optionally as a subclass of dSA (directorySystemAgent) prescribed by X.521.

In the first embodiment, directoryServer has an optionally defined attribute, lastReplRecord attribute 101. This lastReplRecord attribute 101 is an attribute that exists only when a directory server program is on the consumer side, and denotes the replication record identifier 10c. Further, serverApplicationProcess class is made to have optionally defined attributes, ipAddress and hostName, and these attributes denote a directory server on the consumer side.

FIG. 11 shows a format for an attribute value of lastReplRecord attribute.

The attribute value 110 of the lastReplRecord attribute is a character string, in which uppercase letters and lowercase letters are distinguished from each other i.e. a case dependent character string. The replication server program 10 prepares the attribute value 110 by setting a host name (69 in FIG. 6) of the supplier directory server 1s stored in the replication definition file 19, and a record number (72 in FIG. 7) and time stamp (71 in FIG. 7) of the last-stored replication record (70 in FIG. 7) in the replication log file 20, into a host name 111, a record number 112 and a time stamp 113 of the lastReplRecord attribute value 110, respectively.

Here, the host name is a DNS (Domain Name Service) name, and a DNS server transforms it into an Internet address (IP address) which can uniquely identify an information processing apparatus on the Internet.

Stored contents of the replication definition file 19 and of the replication log file 20 will be described later referring to FIGS. 6 and 7.

Figure 4:
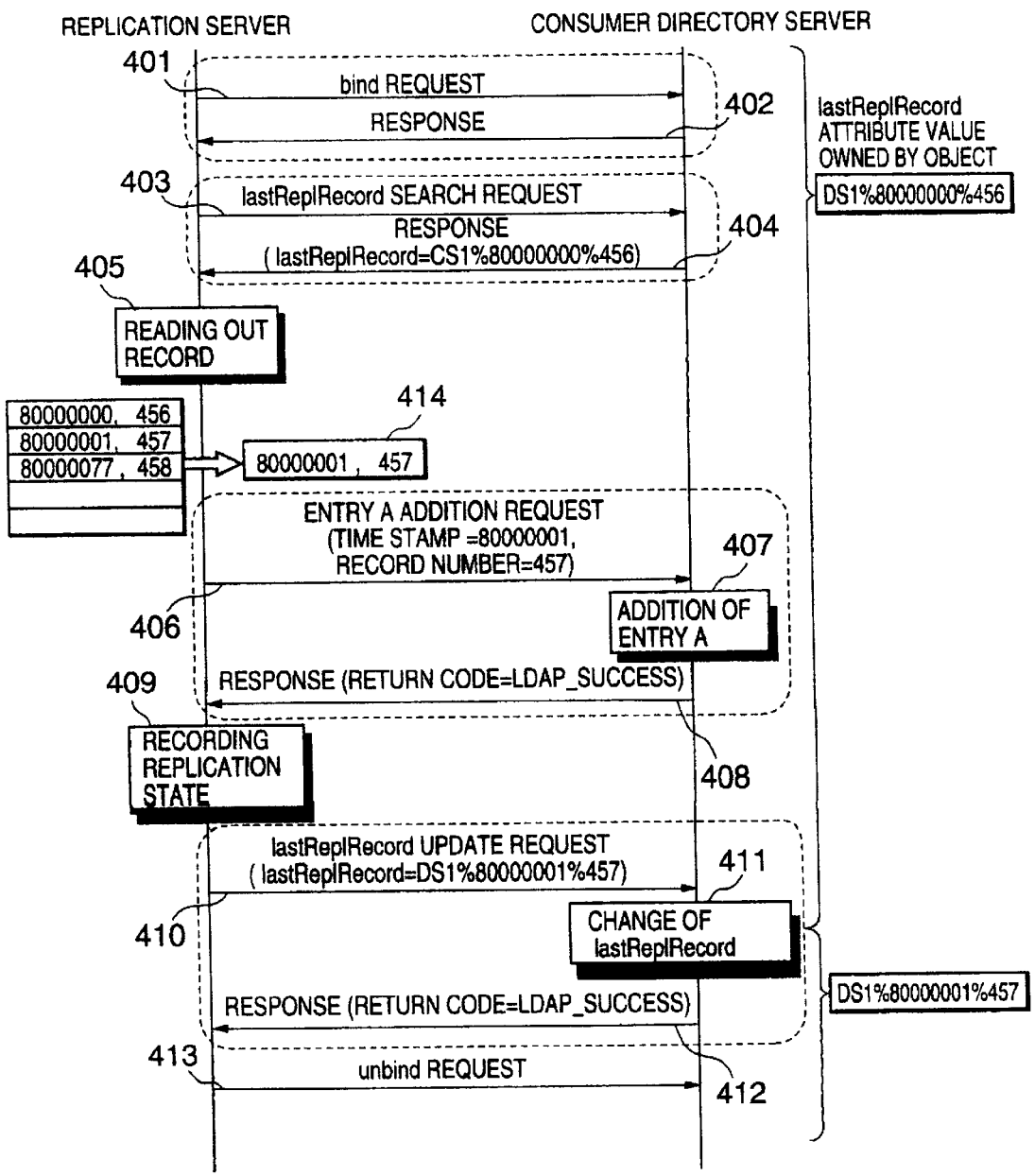
FIG. 4 is an explanatory view showing a sequence of replication service according to the first and second embodiments.

FIG. 4 shows a sequence of the replication service according to the first embodiment.

As shown in FIG. 4, the replication server program 10 issues a bind request (401) to the consumer directory server program 8c first, and receives a response (402) corresponding to it, to establish connection with the consumer directory server program 8c.

Successively, the replication server program 10 issues a lastReplRecord search request (403) to the consumer directory server program 8c for requesting search of an attribute value of the lastReplRecord attribute, and receives a response (404) including the value of lastReplRecord attribute. From the value of the lastReplRecord attribute included in this response (404), the replication server program 10 can obtain the replication record identifier 10c in the replica data 9c managed by the consumer directory server program 8c. Thus, the replication server program 10 can obtain the time stamp and record number of the replication record for specifying the entry changed for the last time by the replication performed in the last session.

Next, the replication server program 10 acquires the time stamp and the record number included in the value 110 of the lastReplRecord attribute for performing the replication in time series for entries on which the replication has not been performed. Based on these acquired values, the replication server program 10 reads out (405) a replication record.

In detail, from the replication log file 20, the replication server program 10 reads out the replication record 414 having the last time stamp and smallest record number out of replication records having a time stamp later than the acquired time stamp "80000000" and a record number greater than the acquired record number "456".

Then, based on the replication record 414 read out, the replication server program generates a replication request.

Here, in the first embodiment, LDAP is employed as a protocol for accessing a directory, and the generated replication request becomes an LDAP access request. Further, it is assumed that a modify operation known from the replication record 414 is an addition operation of the entry A, and accordingly, the generated LDAP access request is an entry A addition request (406).

Successively, the replication server program 10 issues the generated entry A addition request (406) to the consumer directory server program 8c. On receiving the entry A addition request (406), the consumer directory server program 8c performs addition (407) of the entry A and returns a response (408) indicating the execution result.

The replication server program 10 receives the response (408) from the consumer directory server program. When a return code included in this response (408) is "LDAP_SUCCESS" indicating success of the replication, the replication server program 10 stores the time stamp "80000001" and record number "457" of the replication record 414 into the replication status file 21, as a record identifier indicating the replication record 414 (409).

According to the above-described sequence, the entry A addition operation performed in the supplier directory server program 8s is propagated to the consumer directory server program 8c.

Further, in the first embodiment, after the success of the modify operation by the consumer directory server program 8c in accordance with the replication request, the replication server program 10 records the time stamp "80000001" and record number "457" of the replication record 414 on the consumer directory server program 8c.

In detail, it sets the host name of the first directory server 1s on which the supplier directory server program 8s operates, and the time stamp and record number of the replication record 414 into the host name 111, the time stamp 113 and the record number 112 of the lastReplRecord attribute value 110 shown in FIG. 11, respectively, to generate a new value of the lastReplRecord attribute. Then, the replication server program 8s issues a lastReplRecord update request (410) for requesting change of the value of the lastReplRecord attribute value. When the value of the lastReplRecord attribute is changed (411) and a response to the lastReplRecord update request (410) is received, the replication server program 10 issues an unbind request (413) to cut off the connection with the consumer directory server program 8c.

According to the above-described sequence, the replica data 9c managed by the consumer directory server program 8c has the lastReplRecord attribute value indicating the replication record for specifying the last entry changed for the last time by replication, as the replication record identifier 10c.

As described above, the replication server program 10 searches the lastReplRecord attribute value before issuing the replication request, so as to know the replication record identifier 10c for specifying the entry changed for the last time by the replication performed by the last session. As a result, the replication server program 10 can know the replication record that becomes a base for the next replication.

Similarly, for a backup of the replica data 9s at an arbitrary time, the replication server program 10 can make the contents of the master data 9s and the contents of the replica data 9c the same, by acquiring only the replication records for specifying untreated entries that are the different from the master data 9s managed by the supplier directory server program 8s, and by performing the replication.

Thus, according to the first embodiment, by keeping a backup of the replica data 9c including the lastReplRecord attribute value, it is possible to restart the replication for the backup data even when the replica data 9c has been lost owing to, for example, physical damage of a magnetic disk 4c. Accordingly, it is possible for the second directory server 1c to reconstruct the replica data 9c using the backup without acquiring all the entries in the master data 9s from the first directory server 1s, thus improving operability.

In the first embodiment, the replication server program 10 issues one replication request and one lastReplRecord update request in every session, and completes the session. However, it is possible that, in one session, replication requests are issued a plurality of times and then, lastReplRecord update requests are issued a plurality of times, alternately. In that case too, the same effect is obtained in the present invention.

In the first embodiment, a replication request and a lastReplRecord update request are issued as separate requests. Thus, between a modify operation in accordance with the replication request and a modify operation in accordance with a lastReplRecord update request, the value of the lastReplRecord attribute does not indicate a correct replication record identifier 10c.

Accordingly, in a case where a problem arises during that period, error recovery processing is required, and will be described in the following.

Figure 5:
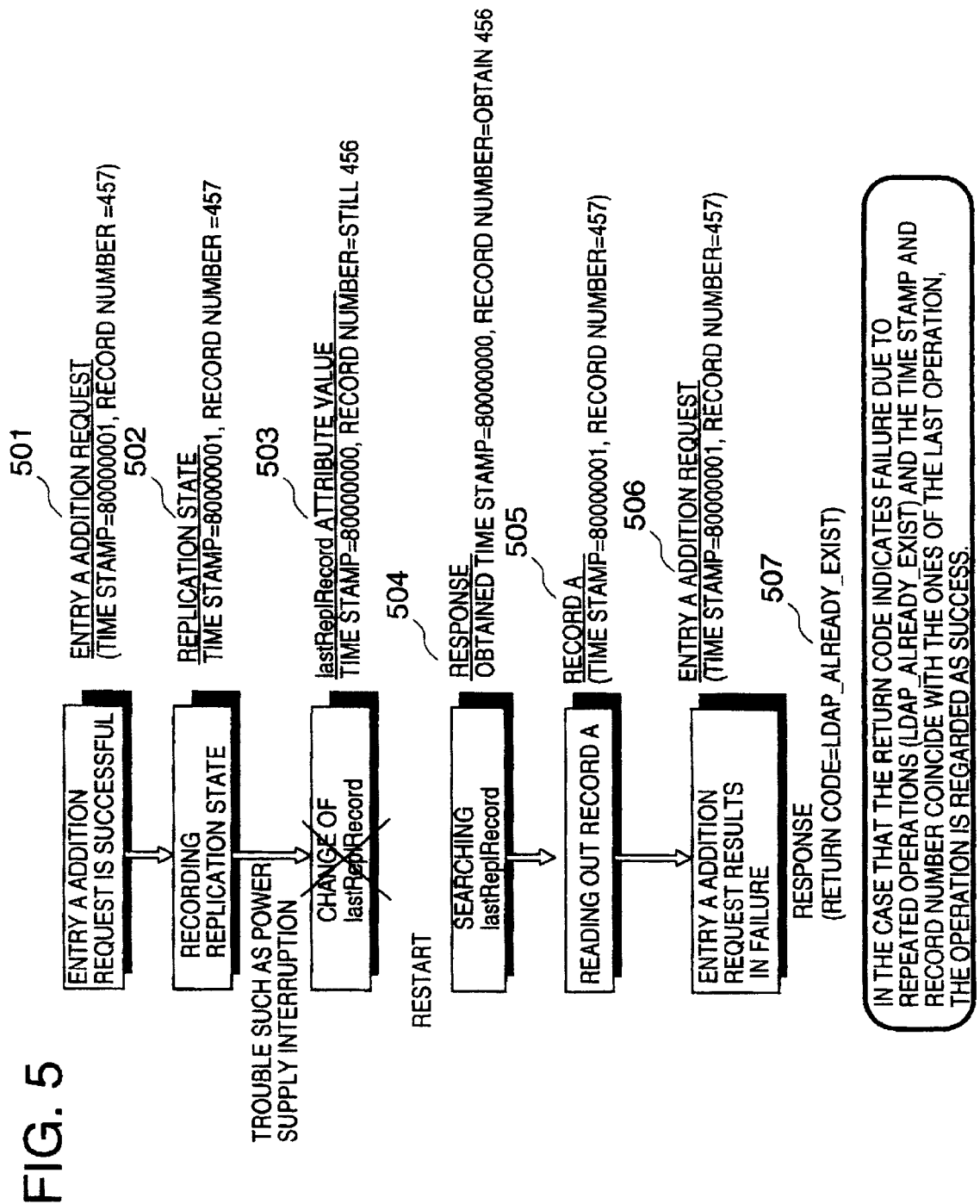
FIG. 5 is an explanatory view showing error recovery processing in the first embodiment.

FIG. 5 shows an error recovery processing to be performed in the following case. Namely, a modify operation in accordance with an entry A addition request (501) is successfully performed by the consumer directory server program 8c. Then, the replication server program 10 records a replication status (502). Thereafter, a problem such as power supply interruption occurs in the second directory server 1c, and the consumer directory server program 8c abnormally ends without performing a modify operation on the lastReplRecord attribute value (503).

In that case, as the consumer directory server program 8c has not performed the modify operation on the lstReplRecord attribute value (503), the replication server program 10 will receive a response (504) including the same value of the lastReplRecord attribute as the one acquired in the replication in the last session, when it searches the lastReplRecord attribute value after the restart. Then, the replication server program 10 again reads out the replication record A (505) read out from the replication log file 20 in the last session, and again issues the same entry A addition request (506) as the one (501) issued in the last session.

Here, if the modify operation according to the entry A addition request (501) was performed successfully before the restart, then, in trying to perform a modify operation according to the entry addition request (506), the consumer directory server program 8c fails in that operation since the entry A exists already. Thus, a return code included in the response (507) to that request becomes "LDAP_ALREADY_EXISTS". Here, "LDAP_ALREADY_EXISTS" is a return code generated when the same entry addition operation is repeated.

Accordingly, in the first embodiment, when a return code included in a response to a replication request is "LDAP_ALREADY_EXISTS", the replication server program 10 judges if the replication request in question (here, the entry A addition request (506)) is the same as the replication request issued in the last session. When they are the same, the replication server program 10 judges that the consumer directory server program 8c has been successful in the modify operation according to that replication request, and then issues a lastReplRecord update request.

Further, when the time stamp and record number of the replication record A (505) are the same respectively as the time stamp and record number stored in the replication status file 21, the replication server program 10 can judge that the replication request issued in the last session and the replication request issued in the current session are the same.

According to the above-described error recovery processing, it is possible to keep replica data 9c correct and to continue the replication, even if a change of the lastReplRecord attribute value can not be performed.

Now, items of information stored respectively in the replication definition file 19, the replication log file 20, and the replication status file 21 will be described.

Figure 6:
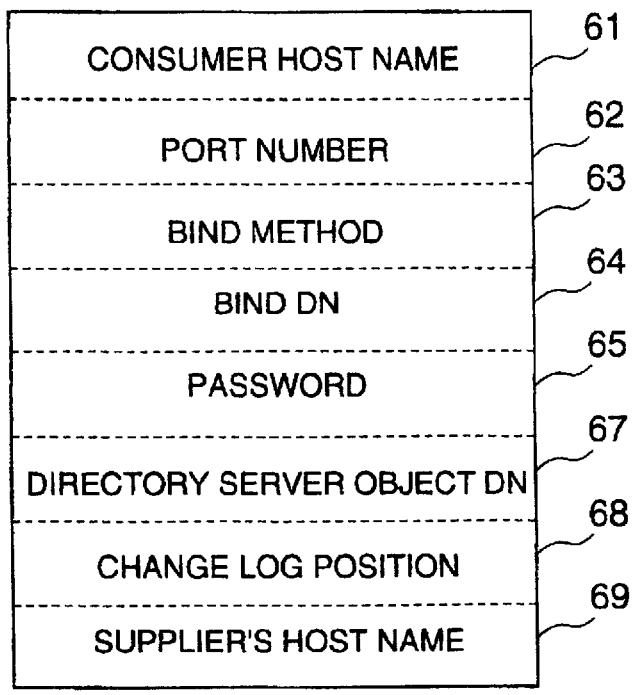
FIG. 6 is an explanatory view showing information to be stored in a replication definition file.

First, FIG. 6 shows information to be stored in the replication definition file 19. These items of information are used when the replication server program 10 establishes connection with the consumer directory server program 8c.

As shown in FIG. 6, the replication definition file 19 stores a host name 61 of the consumer directory server 1c in which the consumer directory sever program 8c operates, a port number 62, a bind method 63, bind DN 64 and password which are authentication information used at the time of binding, a directory server object DN 67, change log position 68, and a host name 69 of the supplier directory server 1s on which the supplier directory server program 8s operates.

Further, the directory server object DN 67 is used for designating a replication record identifier 10c (i.e., an entry in which a lastReplRecord attribute value is set), and the change log position 68 is an absolute path used by the supplier directory server program 8s for storing a replication record into the replication log file 20.

In the first embodiment, as a method of authentication performed at the time of binding, there is employed a method where it is judged if the bind DN 64 and password 65 sent by the replication server program 10 at the time of binding coincide respectively with a bind DN and password registered in advance by an administrator of the consumer directory server program 8c. When they coincide, the consumer directory server program 8c allows the replication server program 10 to establish connection.

An administrator of the replication server program 10 prepares the replication definition file 19 prior to start-up of the replication server program 10.

Figure 7:
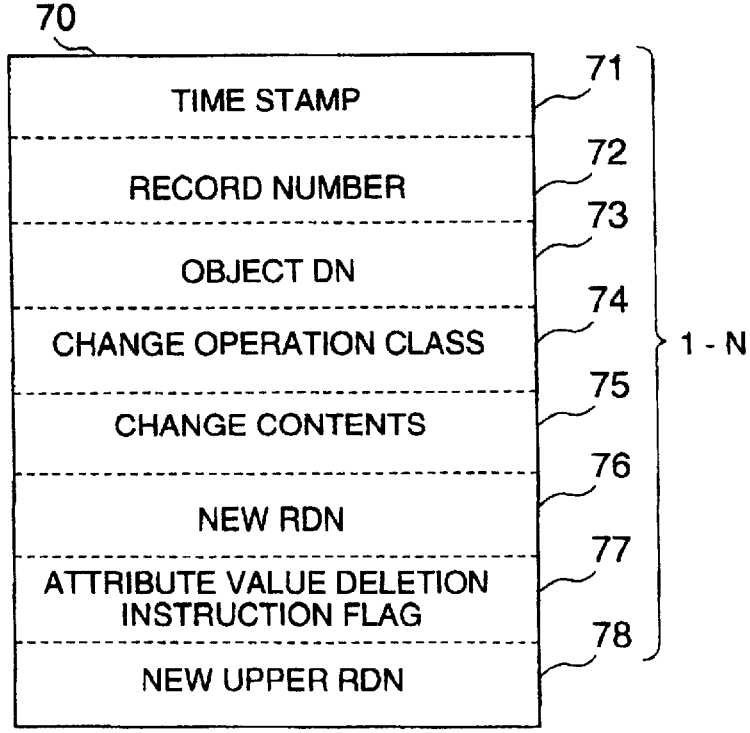
FIG. 7 is an explanatory view showing information to be stored in a replication log file.

FIG. 7 shows information stored in the replication log file 20.

As shown in FIG. 7, for each replication record 70, the replication log file 20 stores the above-described time stamp 71 and record number 72, a modify operation object DN 73, a modify operation type 74, change contents 75, a new RDN 76 as RDN after change, attribute value deletion instruction flag 77, and a new upper RDN 78 as a parent RDN.

In the first embodiment, the time stamp 71 is a character string indicating a number of seconds that have passed from Jan. 1, 1970. Further, the modify operation type 74 indicates the type of modify operation corresponding to the replication record 70. In the modify operation type 74, a string "add" is set when a modify operation is "entry addition", "delete" is set when "entry deletion", "modify" is set when "entry attribute value change", and "modrdn" is set when "RDN change". The attribute value deletion instruction flag 77, a string "1" or "true" is set when an existing RDN attribute value is deleted at the same time with "RDN change", and "0" or "false" is set when an existing RDN attribute value is not deleted at the same time with "RDN change".

The change contents 75 exists only when a modify operation is "entry addition" or "entry attribute modify operation", and the new RDN 76, the attribute value deletion instruction flag 77, the new upper RDN 78 exist only when a modify operation is "RDN change".

Figure 8:
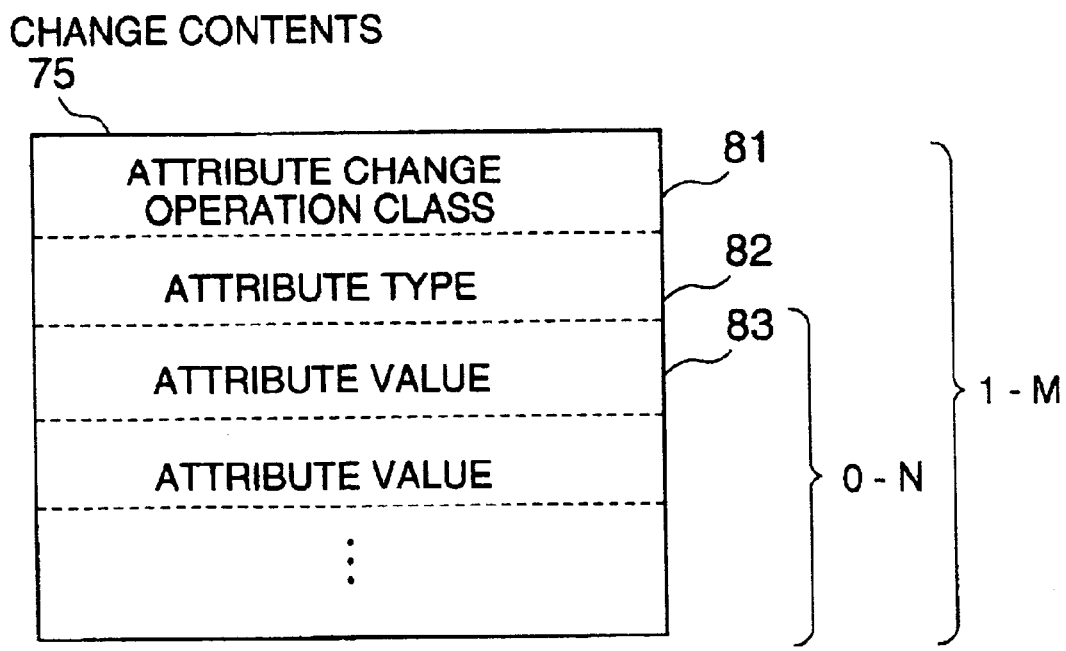
FIG. 8 is an explanatory view showing information to be set into the "change contents" within the replication record shown in FIG. 7, when the "modify operation type" within the replication record is "modify"

FIG. 8 shows the change contents 75 of the replication record 70 when a modify operation is "entry attribute modify operation".

As shown in FIG. 8, in this case, the change contents 75 constitutes a combination of an attribute modify operation type 81 and zero or more than zero of attribute value(s) 83, for each attribute type 82, and one or more of the combinations exist. The attribute modify operation type 81 indicates the kind of modify operation ("entry attribute modify operation") corresponding to the replication record 70. The attribute modify operation type 81, a string "add" is set when a modify operation is "attribute value addition", "delete" is set when "attribute value deletion", and "replace" is set when "attribute value change".

Figure 9:
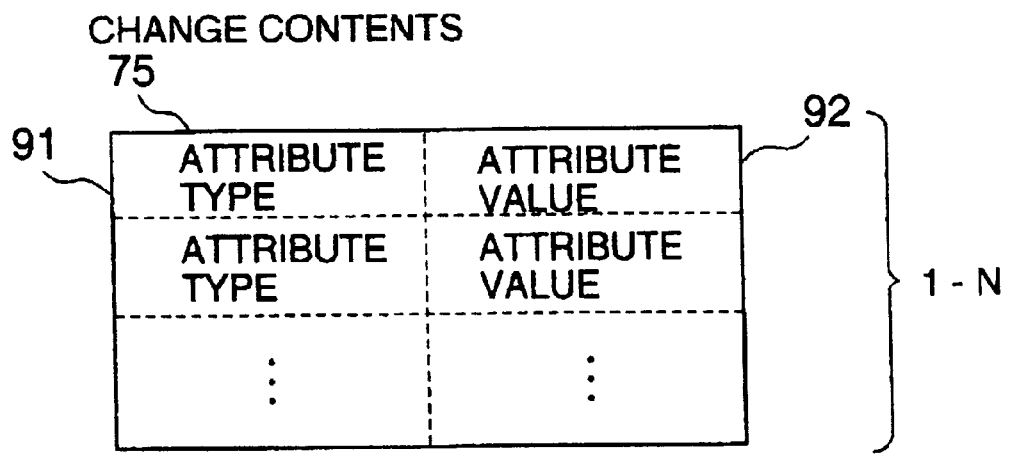
FIG. 9 is an explanatory view showing information to be set into the change contents within a replication record, when the modify operation type within the replication record is "add"

FIG. 9 shows the change contents 75 of the replication record 70 when a modify operation is "entry add operation".

As shown in FIG. 9, in this case, the change contents 75 constitutes a combination of an attribute type 91 and attribute value 92 owned by an entry to be added, and one or more of the combinations exist.

FIG. 12 shows information stored in the replication status file 21.

In FIG. 12, a consumer host name 121 exists for setting a host name of a directory server on which each consumer directory server program 8c operates in a case where the replication server program 10 performs replication for a plurality of consumer directory server programs 8c, and for identifying a replication status for each consumer directory server program 8c.

Further, in the time stamp 122 and record number 123, there a time stamp 71 and record number 72 of the latest replication record 70 that succeeded in replication are set, indicating up to which replication record 70 among replication records stored in the replication log file 20, replication ended.

Next, return codes used in LDAP will be described.

First, FIG. 13 shows LDAP return codes that belong to Group 1.

A LDAP return code of Group 1 is one returned by the directory server program when the same replication request (LDAP access request) is issued a plurality of times.

This return code varies depending on the kind of the update type operation. When an update type operation is "entry addition", the return code is "LDAP_ALREADY_EXISTS" indicating that an entry already exists having the same DN as the DN of the entry of the object of the operation. In the cases of "entry deletion" and "RDN change", the return code is "LDAP_NO_SUCH_OBJECT" indicating that now there is no entry having the same DN as the DN of the entry of the object of the operation. When the update type operation is "entry attribute value addition", the return code is "LDAP_TYPE_OR_VALUE_EXISTS" indicating that an attribute value already exists in the attribute type of the object entry and a plurality of attribute values can not be held, or that the same attribute value already exists. In a case where the update operation is "entry attribute value deletion", the return code is "LDAP_NO_SUCH_ATTRIBUTE" indicating that now there is no attribute value of the object entry.

FIG. 14 shows an LDAP return code that belongs to Group 2.

The return code of Group 2 is one returned by the directory server program when it succeeded in a modify operation in accordance with the replication request (LDAP access request).

In the following, a flow of detailed processing of the replication server program 10 in the first embodiment will be described, referring to FIGS. 15–18.

Figure 15:
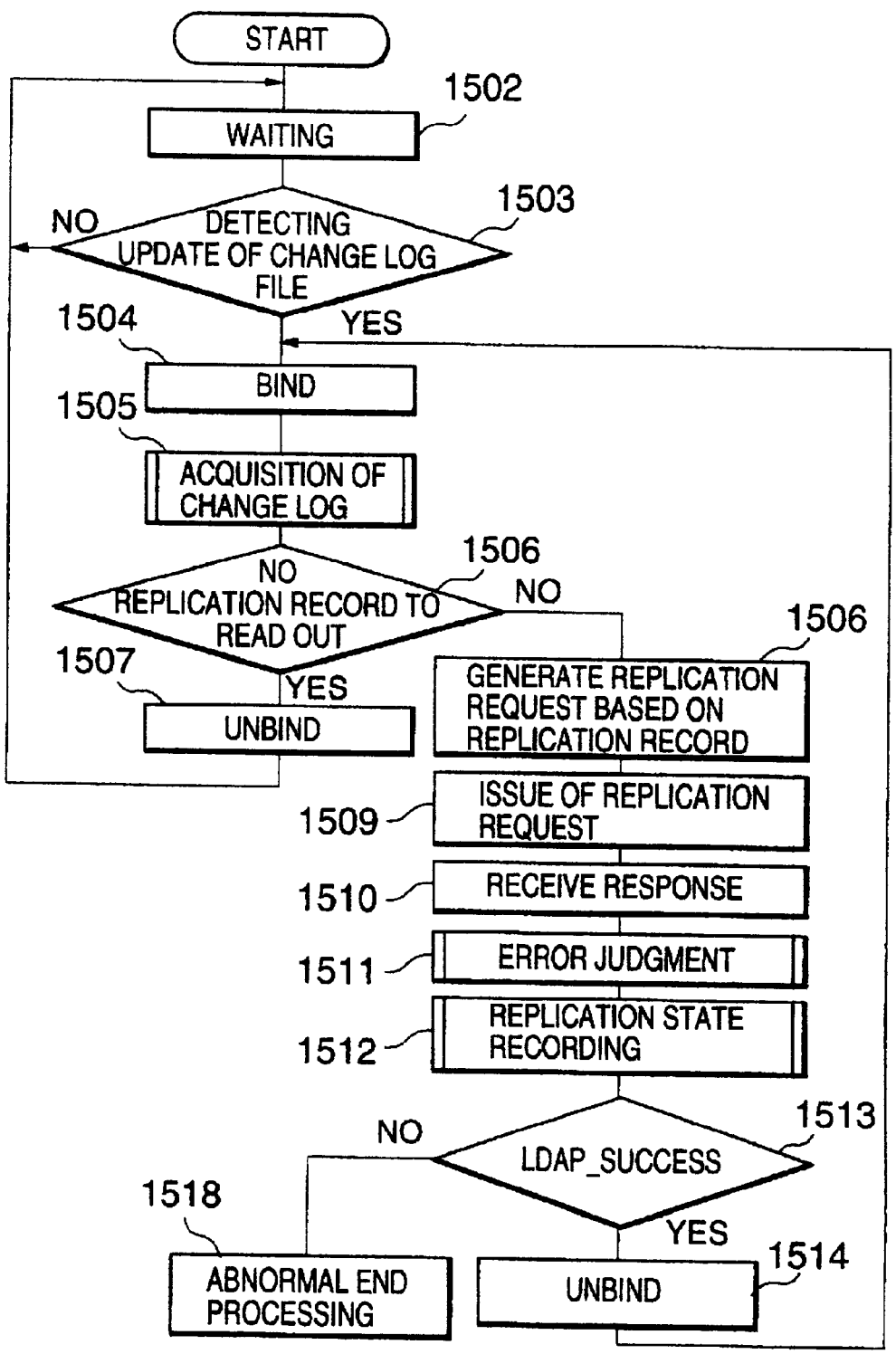
FIG. 15 is a flowchart showing a flow of processing by a replication server program in the first embodiment.

FIG. 15 is a flowchart showing a process flow of the replication server program 10 in the first embodiment.

As shown in FIG. 15, the replication server program 10 has a predetermined waiting time, preparing itself for an update in the replication log file 20 (Step 1502). For example, the waiting time may be set for 5 seconds.

When an update in the replication log file 20 can not be detected within the waiting time (Step 1503), it returns to Step 1502 and waits again.

When the replication server program 10 detects an update in the replication log file 20 within the waiting time (Step 1503), it reads out the host name 61, port number 62, bind method 63, bind DN 64 and password 65 from the replication definition file 19 shown in FIG. 6. Then, using the contents read out, the replication server program 10 generates a bind request, issues the prepared bind request to the consumer directory server program 8c, and receives a response to it (Step 1504).

Thus, establishing a connection with the consumer directory server program 8c, it then receives an authentication from the consumer directory server program 8c, and starts a session.

The replication server program 10 then reads out a change log position 68 from the replication definition file 19 shown in FIG. 6, and acquires a replication record 70 shown in FIG. 7 from the replication log file 20 existing at the change log position 68 read out (Step 1505). Step 1505 is processing performed by the change log acquisition program 11, and its details will be described below referring to FIG. 16. In Step 1505, one replication record 70 at each time is read out from the replication log file 20.

When a replication record 70 to be read out exists, and acquisition of that replication record 70 is successful (Step 1506), the replication server program 10 generates a replication request based on the acquired replication record 70 (Step 1508) and issues it to the consumer directory server program 8c (Step 1509).

Successively, the replication server program 10 receives a response from the consumer directory server program 8c, and acquires a return code included in the received response (Step 1510).

Then, from the acquired return code, it is judged if the lastReplRecord attribute value was not changed in the last session, and accordingly the same replication request as one issued in the last session has been issued in the current session, resulting in an error. In that case, the return code in question is rewritten as "LDAP_SUCCESS" indicating success of a modify operation according to a replication request, and the error is ignored (Step 1511). Step 1511 is processing performed by the error judgment program 13, whose details will be described below referring to FIG. 17.

Then, the replication server program 10 records if the modify operation according to the replication request has been successful or not, into the replication status file 21. Further, in the case of success, the lastReplRecord attribute value is changed (Step 1512). Step 1512 is a processing performed by the replication status recording program 15, whose details will be described below referring to FIG. 18.

Successively, the replication server program 10 judges if the return code (which may be changed in Step 1511) included in the response to the replication request is "LDAP_SUCCESS" or not (Step 1513). In a case where the return code is "LDAP_SUCCESS", it generates an unbind request, and issues the prepared unbind request to the consumer directory server program 8c (Step 1514).

Then, when the connection with the consumer directory server program 8c is released, the replication server program 10 returns to Step 1504, and issues a bind request again to start the next session.

On the other hand, when the return code is not "LDAP_SUCCESS", the replication server program 10 ends abnormally (Step 1516). When a replication record 70 to be read out does not exist (Step 1506), the replication server program 10 issues an unbind request to terminate the session (Step 1507), and then returns to Step 1502, to wait for an update of the replication log file 20, again.

Figure 16:
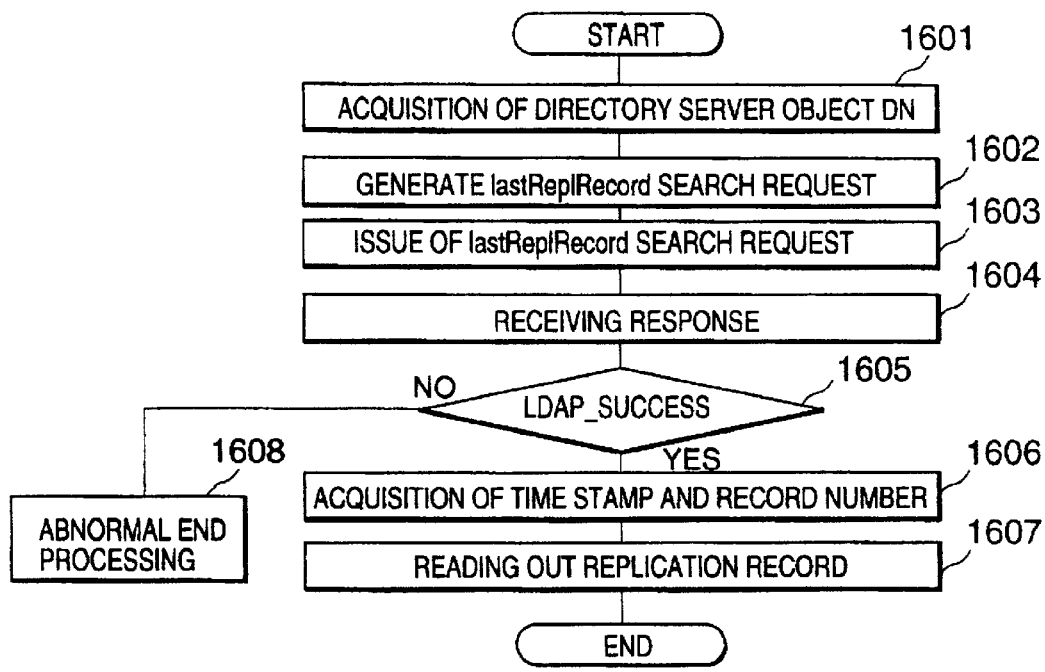
FIG. 16 is a flowchart showing a flow of processing by a change log acquisition program in the first through third embodiments.

FIG. 16 shows a flow of the processing performed by the change log acquisition program 11 in Step 1505 of FIG. 15.

As shown in FIG. 16, the change log acquisition program 11, first, acquires the directory server object DN 67 from the replication definition file 19 shown in FIG. 6 (Step 1601).

Successively, the change log acquisition program 11 generates a lastReplRecord search request for requesting a search of an attribute value designated by the directory server object DN 67, i.e., the lastReplRecord attribute value indicating the replication record identifier 10c (Step 1602), issues the generated lastReplRecord search request (Step 1603), and receives a response to it (Step 1604).

Next, it judges if a return code included in the received response is "LDAP_SUCCESS" or not (Step 1605). When the return code is "LDAP_SUCCESS", it proceeds to Step 1606, and when the return code is not "LDAP_SUCCESS", it proceeds to Step 1608 to end abnormally.

In Step 1606, the lastReplRecord attribute value 110 shown in FIG. 11 is taken out from the received response, and the time stamp 111 and record number 112 are acquired. Then, the replication record 70 having a time stamp 71 later than the time stamp 111 included in the lastReplRecord attribute value 110 and a record number 72 greater than the record number 112 included in the lastReplRecord attribute value 110 is read out from the replication log file 20 (Step 1607), and the change log acquisition program 11 is ended.

Figure 17:
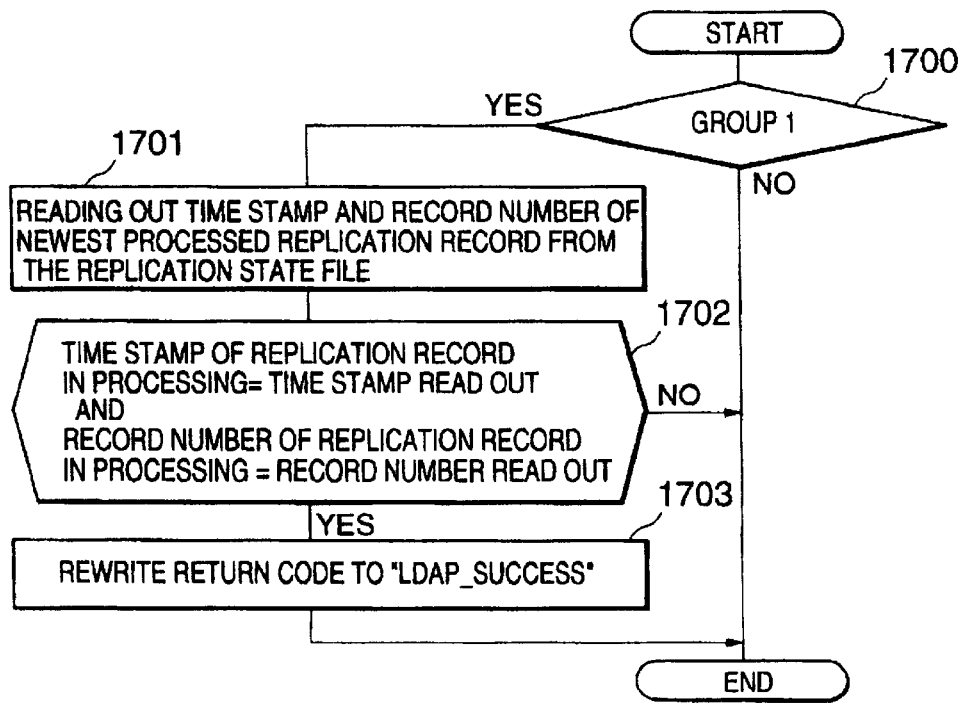
FIG. 17 is a flowchart showing a flow of processing by an error judgment program in the first embodiment.

FIG. 17 shows a flow of the processing performed by the error judgment program 13 in Step 1511 of FIG. 15.

As shown in FIG. 17, the error judgment program 13 first judges whether or not the return code included in the response received from the consumer directory server program 8c belongs to the above-described Group 1 (Step 1700). When the return code does not belong to Group 1, the error judgment program is ended.

In a case where the return code belongs to Group 1 (Step 1700), the error judgment program 13 judges it possible that, although the replication record 70 was correct and both replication server program 10 and consumer server program 8c operate normally, the lastReplRecord attribute value could not be changed in the last session and accordingly the replication server program 10 issued the same replication request repeatedly, and thus caused an error. Accordingly, the error judgment program 13 reads out a time stamp 122 and record number 123 from the replication status file 21 shown in FIG. 12 (Step 1701).

Then, it compares the time stamp 71 and record number 72 of the replication record 70 with the time stamp 122 and record number 123 read out, respectively (Step 1702).

When, as a result of the comparison of Step 1702, the time stamp 71 of the replication record 70 is equal to the time stamp 122, and the record number 72 of the replication record 70 is equal to the record number 123, it assumes that the same replication request as one issued in the current session was issued in the last session, and rewrites the return code as "LDAP_SUCCESS" (Step 1703) before it ends the error judgment program 13.

When the result of the comparison in Step 1702 is other than the above-described case, the error judgment program 13 is ended.

Figure 18:
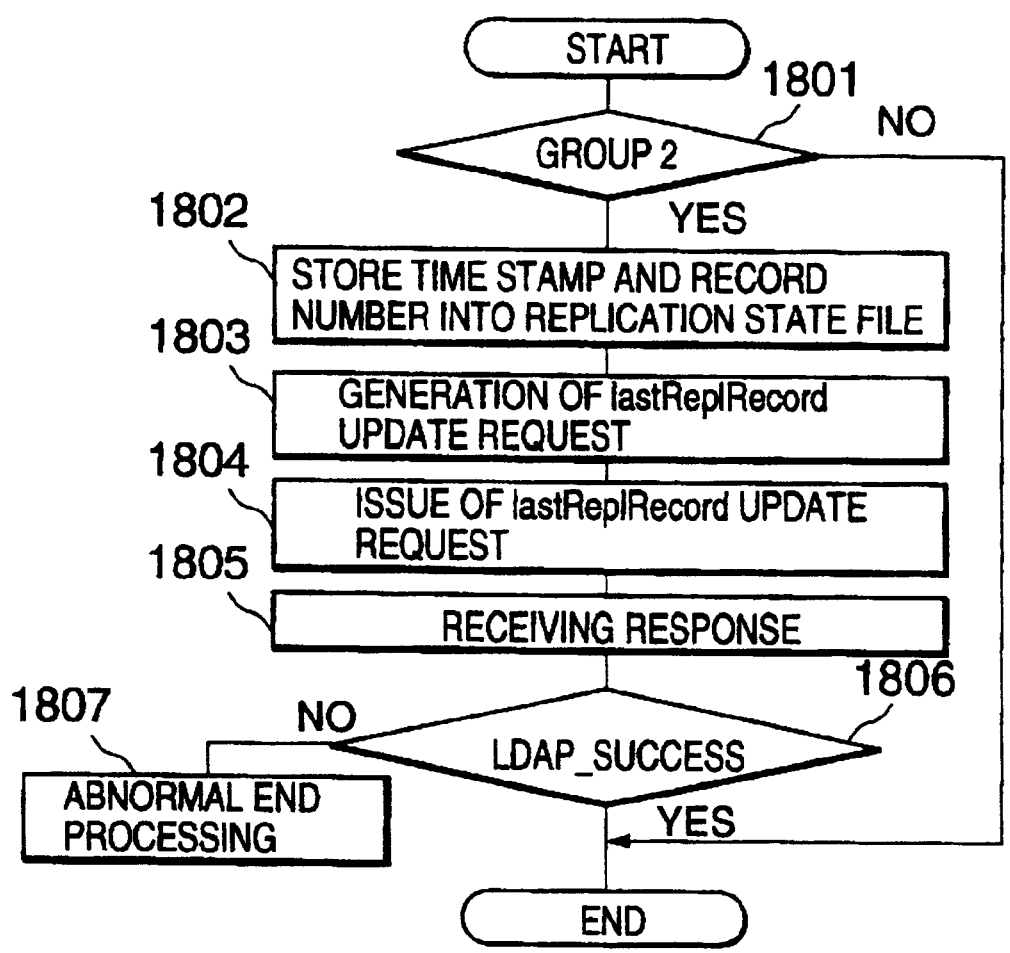
FIG. 18 is a flowchart showing a flow of processing by a replication status recording program of the first embodiment.

FIG. 18 shows the processing flow performed by the replication status recording program 15 in Step 1512 of FIG. 15.

As shown in FIG. 18, the replication status recording program 15 first judges whether or not a return code included in the response received from the consumer directory server program 8c belongs to the above-described Group 2 (step 1801). When the return code does not belong to Group 2, the replication status recording program 15 is ended.

When the return code belongs to Group 2 (Step 1801), it is judged that the modify operation of the consumer directory server program 8c according to the replication request has been successful. It also stores the time stamp 71 and record number 72 of the replication record 70 into the time stamp 122 and record number 123 of the replication status file 21 shown in FIG. 12, respectively (Step 1802).

Successively, the replication status recording program 15 reads out the directory server object DN 67 from the replication definition file 19. Then, it generates a lastReplRecord update request for requesting change of an attribute value of an entry designated by the directory server object DN 67 read out, i.e., the lastReplRecord attribute value indicating a replication record identifier 10c (Step 1803). Next, it issues the generated lastReplRecord update request (Step 1804), and receives a response to it (Step 1805).

Lastly, the replication status recording program 15 judges if a return code included in the received response is "LDAP_SUCCESS" or not (Step 1806). When the return code is not "LDAP_SUCCESS", it ends abnormally (Step 1807). When the return code is "LDAP_SUCCESS", the replication state recording program 15 is ended.

As described above, according to the first embodiment, the replica data 9c has, as the directory record identifier 10c, the lastReplRecord attribute value indicating a replication record for specifying the entry changed for the last time by the replication performed in the last session. Thus, acquiring this lastReplRecord attribute value prior to performing the replication, the replication server program 10 can judge which replication record is to be a base for performing the next replication. Accordingly, by keeping a backup of the replica data 9c, even if the replica data 9s is lost owing to, for example, physical damage of the magnetic disk 4c, the second directory server 1c can reconstruct the replica data 9c using the backup, without acquiring all the entries in the master data 9s from the first directory server 1s.

In the first embodiment, for the second directory server 1c, a modify operation according to a lastReplRecord attribute value update request can be performed similarly to a modify operation according to a replication request. Further, a search operation according to a lastReplRecord attribute search request can be performed as a search operation according to a reference type directory access request. Operation of the second directory server 1c can be similar to the conventional one, when such an entry as one belonging to an object class shown in FIG. 10 and having the lastReplRecord attribute is defined in advance in the replica data 9c managed by the second directory server 1c, as an entry for storing a replication record identifier 10c.

Next, a second embodiment of the present invention will be described.

In the conventional technique, when a replication is ended abnormally owing to power supply interruption or the like after issuance of the replication request and before reception of a response to that replication request, the first directory server 1s performing the replication can not know if the replication request has been reflected in the second directory server 1c or not. Thus, there is such a risk that, after recovery from the problem, the replication may not be restarted normally. In the first embodiment, a method to resolve such a problem has not been discussed.

Namely, in the first embodiment, when a replication is ended abnormally owing to such a problem as power supply interruption after issuance of the replication request and before reception of a response from the consumer directory server program 8c, the replication server program 10 can not judge if a modify operation by the consumer directory server program 8c according to the replication request has been successful or not. In that case, it is necessary for the administrator to cause the same replication request as the replication request issued before the abnormal end to be issued again, or to cause a lastReplRecord search request to be issued, so as to confirm if the modify operation by the consumer directory server program 8c according to the replication request has been successful or not, and then to determine which replication record should be the base of the next replication.

Accordingly, in the second embodiment, it is intended that, even if the replication is ended abnormally owing to an unexpected problem at any point of time, the replication can be restarted normally after recovery from the problem, and thus improve its operability.

To that end, in the second embodiment, the consumer directory server program 8c has a transaction function, and a modify operation according to a replication request and a modify operation according to a lastReplRecord update request are processed in the same transaction, so as to assure consistency of the replica data 9c with the lastReplRecord attribute value.

In the following, the second embodiment will be described only with respect to its difference from the first embodiment.

A system configuration of a directory system according to the second embodiment is similar to the one shown in FIG. 2 with the error judgment program 13 being removed. Further, a functional configuration of the replication service according the second embodiment is similar to the one shown in FIG. 1 with the error judgment part 13' being removed.

Further, the consumer directory server program 8c in the second embodiment has such a transaction function that a series of requests received between a bind request and an unbind request are processed in the same transaction.

In detail, in FIG. 4, when change (411) of the lastReplRecord attribute value results in failure, the addition of an entry A (407) performed immediately before is canceled. Further, also in a case where the connection is cut off after an entry A (407) is added and before arrival of an unbind request, the addition of the entry A (407) performed immediately before is canceled.

Accordingly, always either both the replication request and the lastReplRecord request are reflected or none of them is reflected. As a result, a lastReplRecord attribute value held by the replica data 9c as a replication record identifier 10c is always a correct value indicating the replication record for specifying the entry changed the replication for the last time. Accordingly, the error judgment program 13 in the first embodiment becomes unnecessary.

In the following, detailed processing flow by the replication server program 10 in the second embodiment will be described referring to FIGS. 19 and 28.

Figure 19:
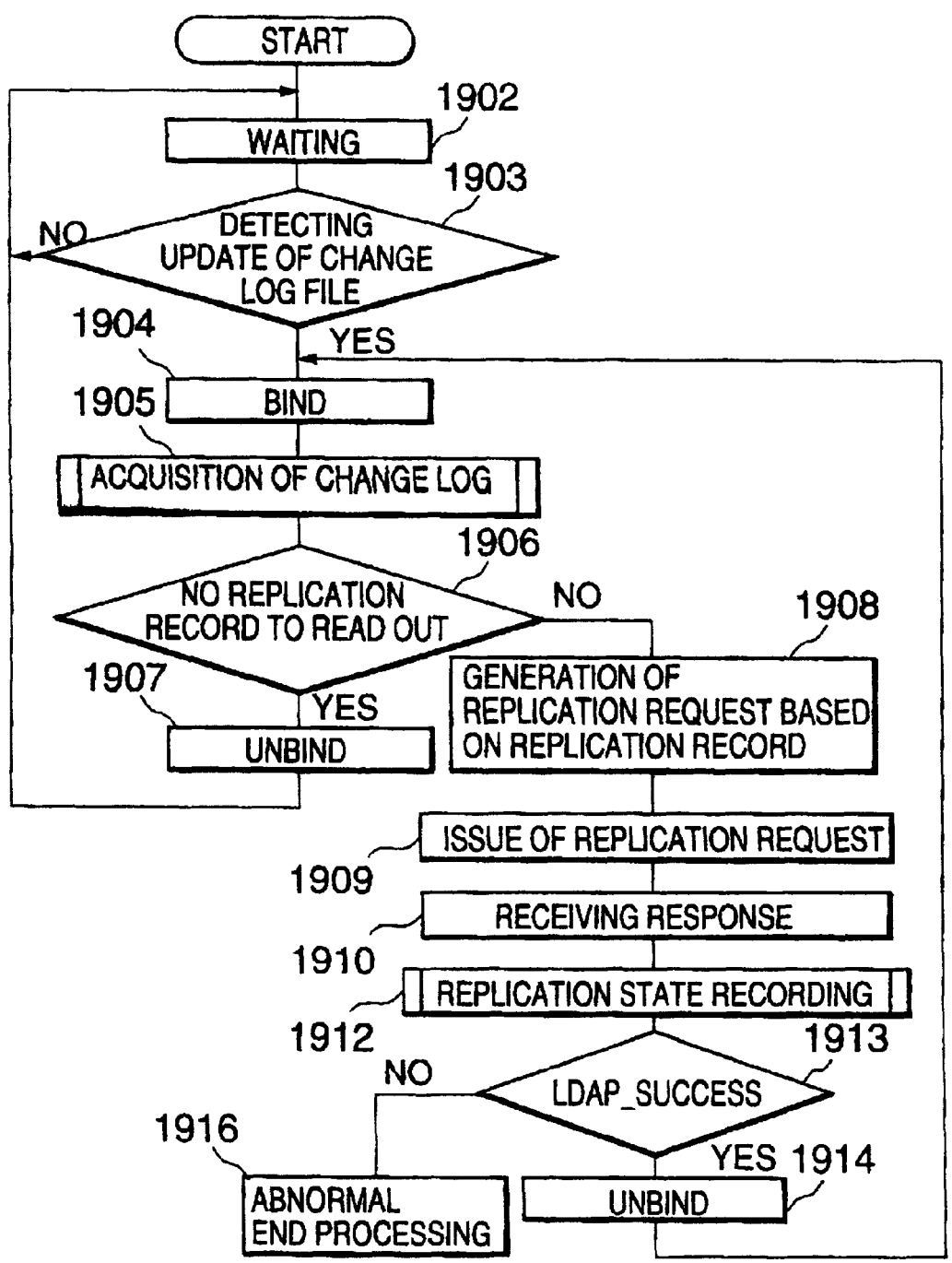
FIG. 19 is a flowchart showing a flow of processing by a replication server program of the second embodiment.

FIG. 19 is a flowchart showing a flow of processing by the replication server program 10 in the second embodiment.

As shown in FIG. 19, the replication server program 10 first waits a predetermined waiting time, preparing itself for an update in the replication log file 20 (Step 1902). For example, the waiting time may be set for 5 seconds.

When an update in the replication log file 20 can not be detected within the waiting time (Step 1903), the replication server program 10 returns to Step 1902 and waits again.

When the replication server program 10 detects an update in the replication log file 20 within the waiting time (Step 1903), it reads out the host name 61, port number 62, bind method 63, bind DN 64 and password 65 from the replication definition file 19 shown in FIG. 6. Then, using the contents read out, the replication server program 10 generates a bind request, issues the prepared bind request to the consumer directory server program 8c, and receives a response to it (Step 1904).

Thus, establishing a connection with the consumer directory server program 8c, it then receives an authentication from the consumer directory server program 8c, and starts a session.

Then, the replication server program 10 reads out a change log position 68 from the replication definition file 19 shown in FIG. 6, and acquires a replication record 70 shown in FIG. 7 from the replication log file 20 existing at the change log position 68 read out (Step 1905). Step 1905 is processing performed by the change log acquisition program 11, and its details are as described referring to FIG. 16. In Step 1905, one replication record 70 at each time is read out from the replication log file 20.

When the replication record 70 to be read out exists, and acquisition of that replication record 70 is successful (Step 1906), the replication server program 10 generates a replication request based on the acquired replication record 70 (Step 1908) and issues it to the consumer directory server program 8c (Step 1909).

Successively, the replication server program 10 receives a response from the consumer directory server program 8c, and acquires a return code included in the received response (Step 1910).

Then, the replication server program 10 changes the lastReplRecord attribute value (Step 1912). Step 1912 is processing performed by the replication status recording program 15, whose details will be described below referring to FIG. 28.

Successively, the replication server program 10 judges if the return code included in the response to the replication request is "LDAP_SUCCESS" or not (Step 1913). In a case where the return code is "LDAP_SUCCESS", it generates an unbind request, and issues the generated unbind request to the consumer directory server program 8c (Step 1914).

Then, when the connection with the consumer directory server program 8c is released, the replication server program 10 returns to Step 1904, and issues a bind request again to start the next session.

On the other hand, when the return code is not "LDAP_SUCCESS", the replication server program 10 ends abnormally (Step 1916). When a replication record 70 to be read out does not exist (Step 1906), the replication server program 10 issues an unbind request to terminate the session (Step 1907), and then returns to Step 1902, to re-await an update of the replication log file 20.

Figure 28:
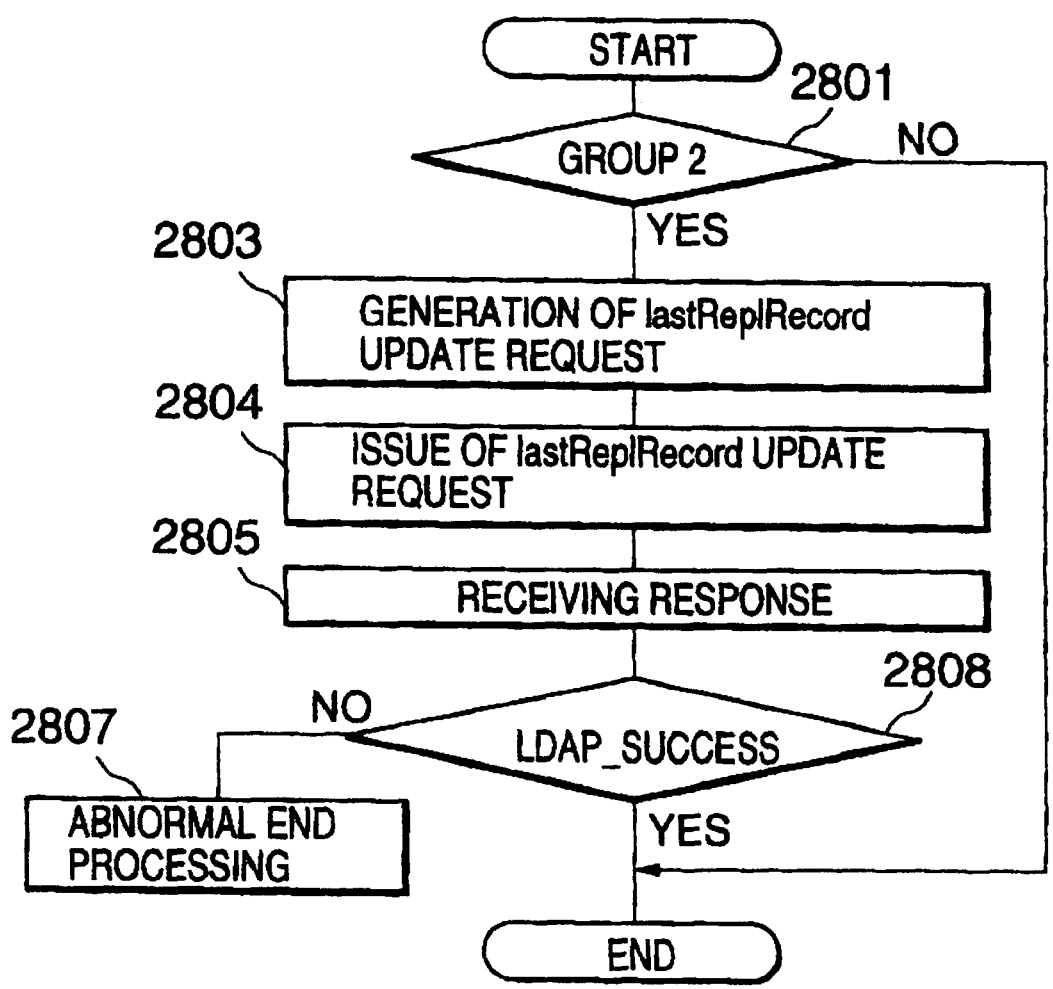
FIG. 28 is a flowchart showing a flow of processing by a replication status recording program according to the second embodiment.

FIG. 28 shows a flow of the processing performed by the replication status recording program 15 in Step 1912 of FIG. 19.

As shown in FIG. 28, the replication status recording program 15 first judges whether or not a return code included in the response received from the consumer directory server program 8c belongs to the above-described Group 2 (step 2801). When the return code does not belong to Group 2, the replication status recording program 15 is ended.

When the return code belongs to Group 2 (Step 2801), it judges that the modify operation of the consumer directory server program 8c according to the replication request has been successful. It also reads out the directory server object DN 67 from the replication definition file 19. Then, it generates the lastReplRecord update request for requesting change of an attribute value of an entry designated by the directory server object DN 67 read out, i.e., the lastReplRecord attribute value indicating a replication record identifier 10c (Step 2803). Next, it issues the prepared lastReplRecord update request (Step 2804), and receives a response to it (Step 2805).

Lastly, the replication status recording program 15 judges if a return code included in the received response is "LDAP_SUCCESS" or not (Step 2806). When the return code is not "LDAP_SUCCESS", it ends abnormally (Step 2807). When the return code is "LDAP_SUCCESS", the replication sate recording program 15 is ended.

As described above, according to the second embodiment, in addition to the features of the first embodiment, the consumer directory server program 8c has the transaction function, and processes a modify operation according to the replication request and a modify operation according to the lastReplRecord request in the same transaction. Thus, consistency of the replica data 9c with the lastReplRecord attribute value is assured.

Accordingly, even if the replication ends abnormally owing to an unexpected problem at any point in time, that replication can be restarted after recovery from the problem, thus improving operability. Further, the administrator does not need to be anxious about the extent to which replication has proceeded.

In the second embodiment, in each session, the replication server program 10 issues a single replication request and a single lastReplRecord update request, and completes the session. However, it is possible that, in each session, the replication requests are issued a plurality of times, and the lastReplRecord update request is issued correspondingly to the last replication request. In that case too, the same effect is obtained in the present invention, since consistency of the replica data 9c with the lastReplRecord attribute value is assured by the transaction function of the consumer directory server program 8c.

Next, a third embodiment of the present invention will be described.

In the first and second embodiments, it is necessary for the replication server program 10 to issue a lastReplRecord update request for requesting a change of the lastReplRecord attribute, in addition to a replication request. Accordingly, network traffic is increased in comparison with the ordinary replication service.

In the third embodiment, instead of issuing the lastReplRecord update request, an extension function of LDAP is used to transmit a new lastReplRecord attribute value to the consumer directory server program 8c, thus suppressing increase of network traffic.

In the following, the third embodiment will be described only with respect to its difference from the first embodiment.

In the third embodiment, an operation for changing the lastReplRecord attribute value is realized by the extension function of the consumer directory server program 8c. Namely, in the third embodiment, the consumer directory server program 8c has such a function that, when a Control field of a received replication request includes instructions to apply the extension function, the consumer directory server program 8c performs a modify operation of the lastReplRecord attribute value in addition to a modify operation in accordance with the replication request in question, processing these two modify operations in the same transaction.

Figure 27:
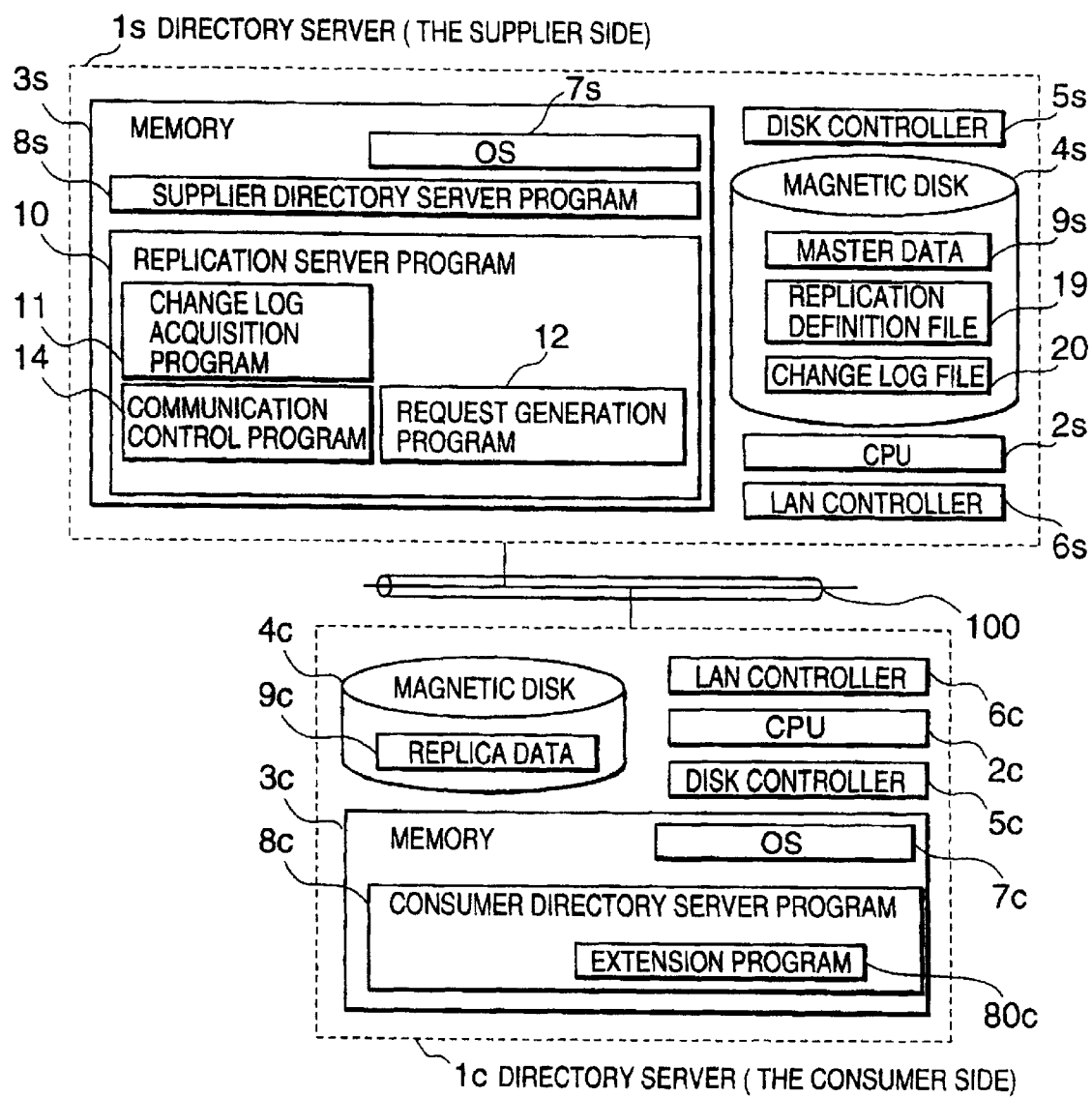
FIG. 27 is an explanatory view showing a system configuration of a directory system according to the third embodiment.

FIG. 27 shows a system configuration of the directory system according to the third embodiment.

As shown in FIG. 27, the system configuration of the directory system according to the third embodiment differs from the system configuration shown in FIG. 2 in that the former does not include the error judgment program 13, the replication status recording program 15, and the replication status file 21, and includes an extension program 80c performing the extension function for changing the lastReplRecord attribute value.

The extension program 80c in the third embodiment is a program constituting the consumer directory server program 8c, and is started up by a value of the Control field included in the replication request received.

Figure 26:
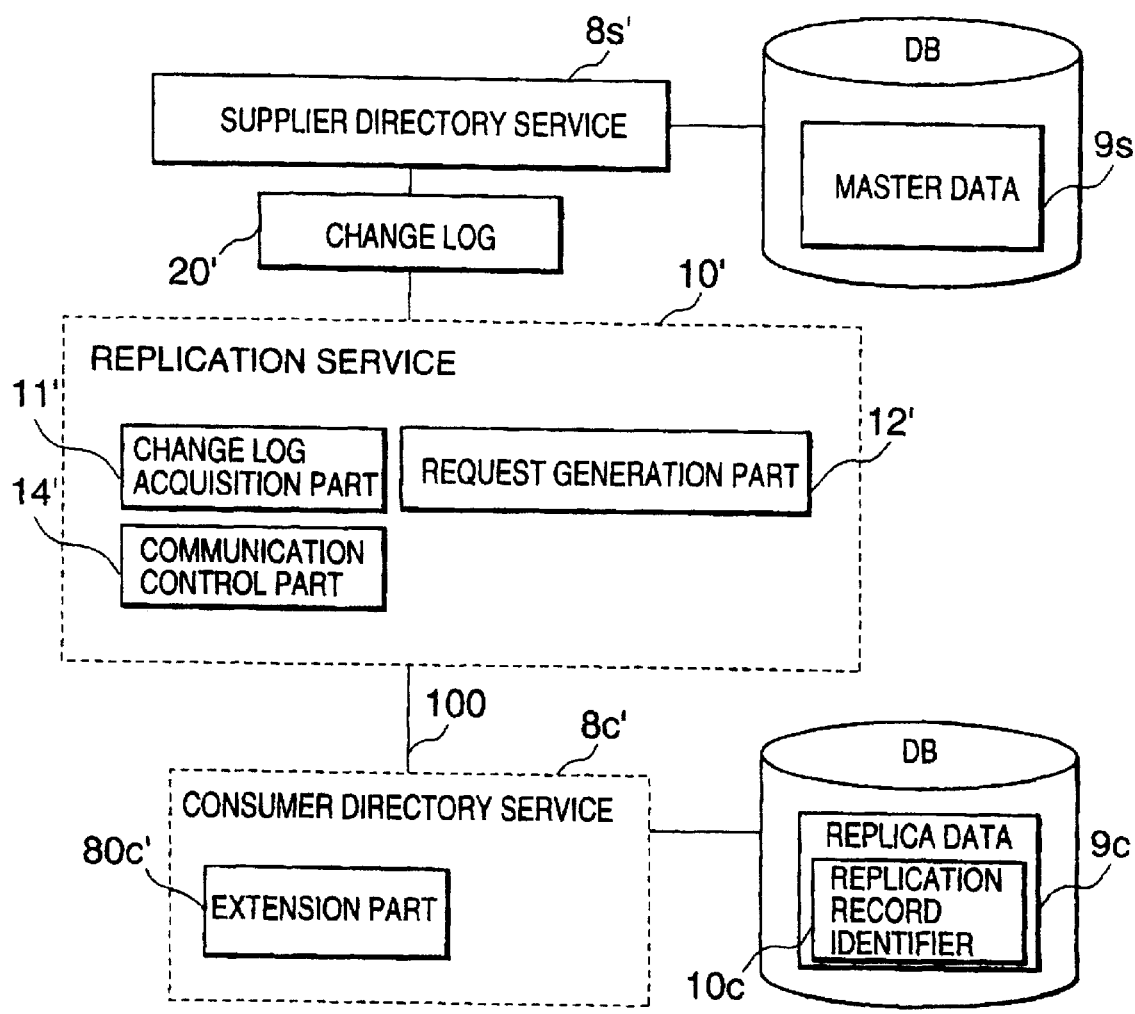
FIG. 26 is an explanatory view showing a functional configuration of replication service according to the third embodiment.

FIG. 26 shows a functional configuration of the replication service according to the third embodiment.

As shown in FIG. 26, the functional configuration of the replication service according to the third embodiment differs from the functional configuration shown in FIG. 1 in that the former does not include the error judgment part 13' and the replication status recording part 15', and includes an extension part 80c' as a functional block realized by the extension program 80c shown in FIG. 27.

FIG. 20 shows a notation of an LDAP access request provided as RFC1777 using ASN.1 provided as ISO8824.

In this figure, messageID (2001) is a value added to identify an LDAP access request uniquely in one LDAP session. Protocol0p (2002) shows the actual contents of the LDAP access request, and Controls (2003) indicates an extension function applied only to the corresponding LDAP access request.

A developer of an application can prepare his own extension function within the directory server program in advance, and can use Controls (2003) in an LDAP access request to instruct the directory server program to apply that extension function.

FIG. 21 shows a notation of Controls (2003) in accordance with ASN.1.

Controls (2003) consists of a plurality of control fields. As for each control field, an identifier unique in the world (LDAPOID) is set in controlType (2101), as described in X.208 recommendation of CCITT, for identifying an extension function uniquely, "TRUE" or "FALSE" is set in criticality (2102), and a value used only in the extension function is set as an octet character string in control value (2103).

When "TRUE" is set in criticality (2102), and the consumer directory server program 8c can not recognize/perform the extension function corresponding to controlType (2103), then the consumer directory server program 8c returns a return code, "unsupportedCriticalExtension" indicating that the extension function is not supported. When "FALSE" is set in criticality (2102), Controls (2003) is disregarded.

Figures 22, 23:
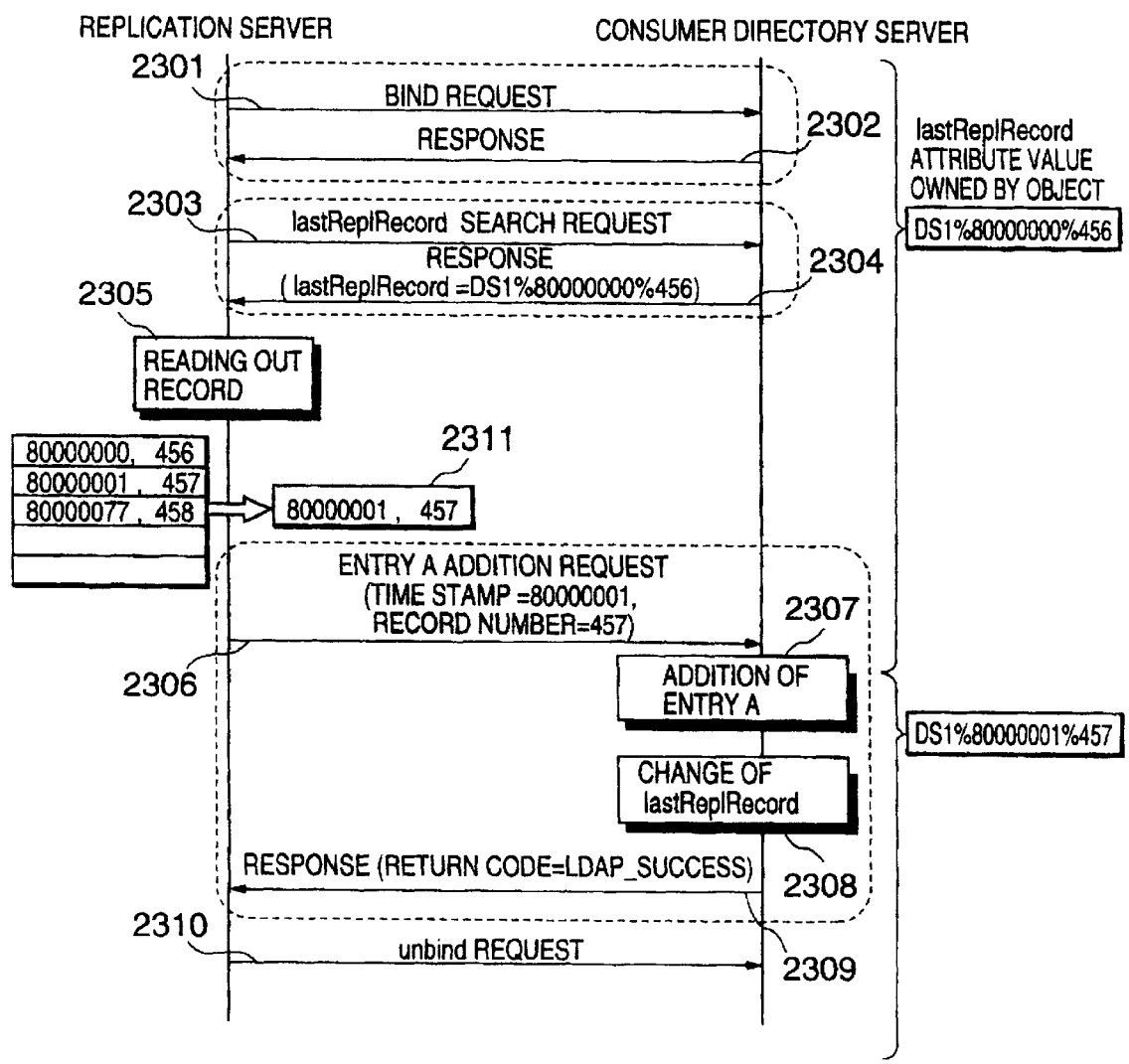
FIG. 22 is an explanatory view showing information to be set into Control field of a replication request in the third embodiment.
FIG. 23 is an explanatory view showing a sequence of replication service according to the third embodiment.

FIG. 22 shows a notation of the Control field included in a replication request in the third embodiment, in accordance with ASN.1.

In the third embodiment, Control field instructs application of an extension function that changes the lastReplRecord attribute value.

ControlType (2201) is set to an object identifier "<repOid> indicating the extension function, criticality (2202) is set to "TRUE" , and control value (2203) is set to a new lastReplRecord attribute value, "<lastReplRecord>".

FIG. 23 shows a sequence of the replication service according to the third embodiment.

As shown in FIG. 23, the replication server program 10 issues a bind request (2301) to the consumer directory server program 8c, and receives a response (2302) to that request, so as to establish connection with the consumer directory server program 8c.

Successively , the replication server program 10 issues a lastReplRecord search request (2303) to the consumer directory server program 8c for requesting search of an attribute value of lastReplRecord attribute, and receives a response (2304) including the value of lastReplRecord attribute. From the value of the lastReplRecord attribute included in this response (2304), the replication server program 10 can obtain the replication record identifier 10c in the replica data 9c managed by the consumer directory server program 8c. Thus, the replication server program 10 can know the time stamp and record number of the replication record for specifying the entry changed for the last time by replication performed in the last session.

Next, the replication server program 10 acquires the time stamp and the record number included in the lastReplRecord attribute value for performing replication in time series for entries on which replication is not performed. Based on these acquired values, the replication server program 10 performs reading out (2305) of replication records.

In detail, from the replication log file 20, the replication server program 10 reads out the replication record 2314 having the last time stamp and smallest record number out of replication records having a time stamp later than the acquired time stamp "80000000" and a record number greater than the acquired record number "456".

Then, based on the replication record 2314 read out, the replication server program generates a replication request.

Here, in the third embodiment, LDAP is employed as a protocol, and the generated replication request becomes an LDAP access request. Further, it is assumed here that a modify operation known from the replication record 2314 is an addition operation of the entry A, and accordingly, the generated LDAP access request is an entry A addition request (2306).

Successively, the replication server program 10 issues the generated entry A addition request (2306) to the consumer directory server program 8c.

In the third embodiment, for changing the directory record identifier 10c within the replica data 9c, the replication server program 10 sets the host name of the first directory server 1s on which the supplier directory server program 8s operates, and the time stamp and record number held by the replication record (2311) into the host name 111, and the time stamp 113 and the record number 112 of the lastReplRecord attribute value 110 shown in FIG. 11, respectively, to generate a new value of the lastReplRecord attribute. The new lastReplRecord attribute value is set in controlvalue of Control field within an entry A addition request (2306).

On receiving such an entry A addition request (2306), the consumer directory server program 8c performs the addition of the entry A (2307) and a change of the lastReplRecord attribute value (2308) in the same transaction, and sends a response (2309) indicating the execution result.

On receiving the response (2309) from the consumer directory server program 8c, the replication server program 10 issues an unbind request (2310) to cut off the connection with the consumer directory server program 8c.

According to the above-described sequence, the entry A addition operation performed in the supplier directory server program 8s is propagated to the consumer directory server program 8c. Further, the replica data 9c has the new lastReplRecord attribute value indicating the replication record for specifying the entry changed for the last time by replication, as the replication record identifier 10c.

Further, since the entry A addition operation and the modify operation of the lastReplRecord attribute value are performed in the same transaction, consistency of the replica data 9c with the lastReplRecord attribute value is assured.

In the following, a flow of processing by the replication server program 10 in the third embodiment will be described in detail referring to FIG. 25.

Figure 25:
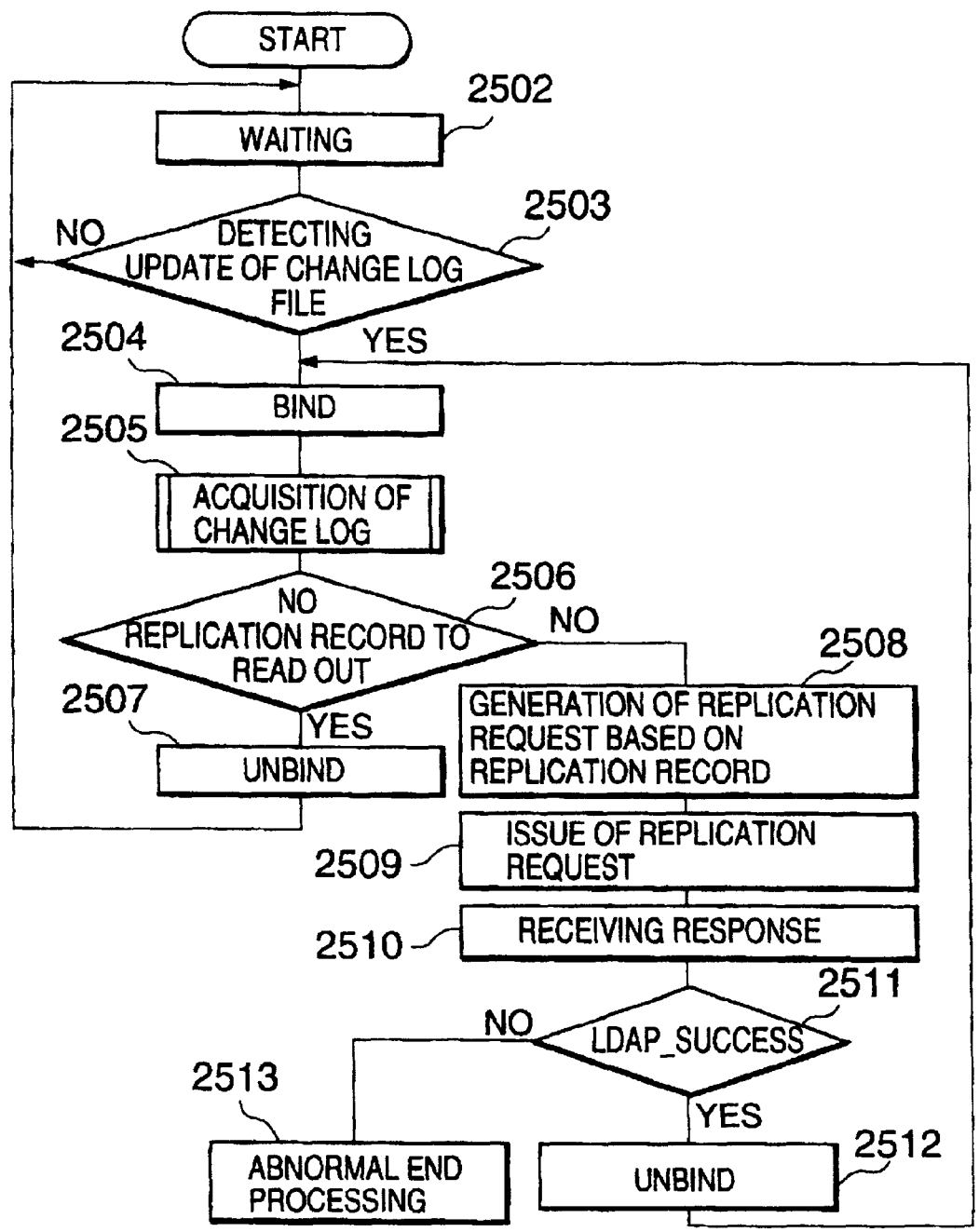
FIG. 25 is a flowchart showing a flow of processing by a replication server program in the third embodiment.

FIG. 25 is a flowchart showing a flow of the processing by the replication server program 10 in the third embodiment.

As shown in FIG. 25, the replication server program 10 first waits a predetermined waiting time, preparing itself for an update in the replication log file 20 (Step 2502). For example, the waiting time may be set for 5 seconds.

When an update in the replication log file 20 can not be detected within the waiting time (Step 2503), it returns to Step 2502 and waits again.

When the replication server program 10 detects an update in the replication log file 20 within the waiting time (Step 2503), it reads out the host name 61, port number 62, bind method 63, bind DN 64 and password 65 from the replication definition file 19 shown in FIG. 6. Then, using the contents read out, the replication server program 10 generates a bind request, issues the generated bind request to the consumer directory server program 8c, and receives a response to it (Step 2504).

Thus, establishing a connection with the consumer directory server program 8c, it then receives an authentication from the consumer directory server program 8c, and starts a session.

Then, the replication server program 10 reads out a change log position 68 from the replication definition file 19 shown in FIG. 6, and acquires a replication record 70 shown in FIG. 7 from the replication log file 20 existing at the change log position 68 read out (Step 2505). Step 2505 is processing performed by the change log acquisition program 11, and its details are as described above referring to FIG. 16. In Step 2505, at one time, one replication record 70 is read out from the replication log file 20.

When the replication record 70 to be read out exists, and acquisition of that replication record 70 is successful (Step 2506), the replication server program 10 generates a replication request based on the acquired replication record 70 (Step 2508) and issues it to the consumer directory server program 8c (Step 2509). In the third embodiment, in Step 2508, the replication server program 10 sets the value shown in FIG. 22 into Control field under replication request.

Successively, the replication server program 10 receives a response from the consumer directory server program 8c, and acquires a return code included in the received response (Step 2510).

Then, the replication server program 10 judges if the received return code is "LDAP_SUCCESS" or not (Step 2511). When the return code is "LDAP_SUCCESS", it generates an unbind request, and issues the generated unbind request to the consumer directory server program 8c (Step 2512).

Then, when the connection with the consumer directory server program 8c is released, the replication server program 10 returns to Step 2504, and issues a bind request again to start the next session.

On the other hand, when the return code is not "LDAP_SUCCESS", the replication server program 10 ends abnormally (Step 2513). When the replication record 70 to be read out does not exist (Step 2506), the replication server program 10 issues an unbind request to terminate the session (Step 2507), and then returns to Step 2502, to wait again for an update of the replication log file 20.

Figure 24:
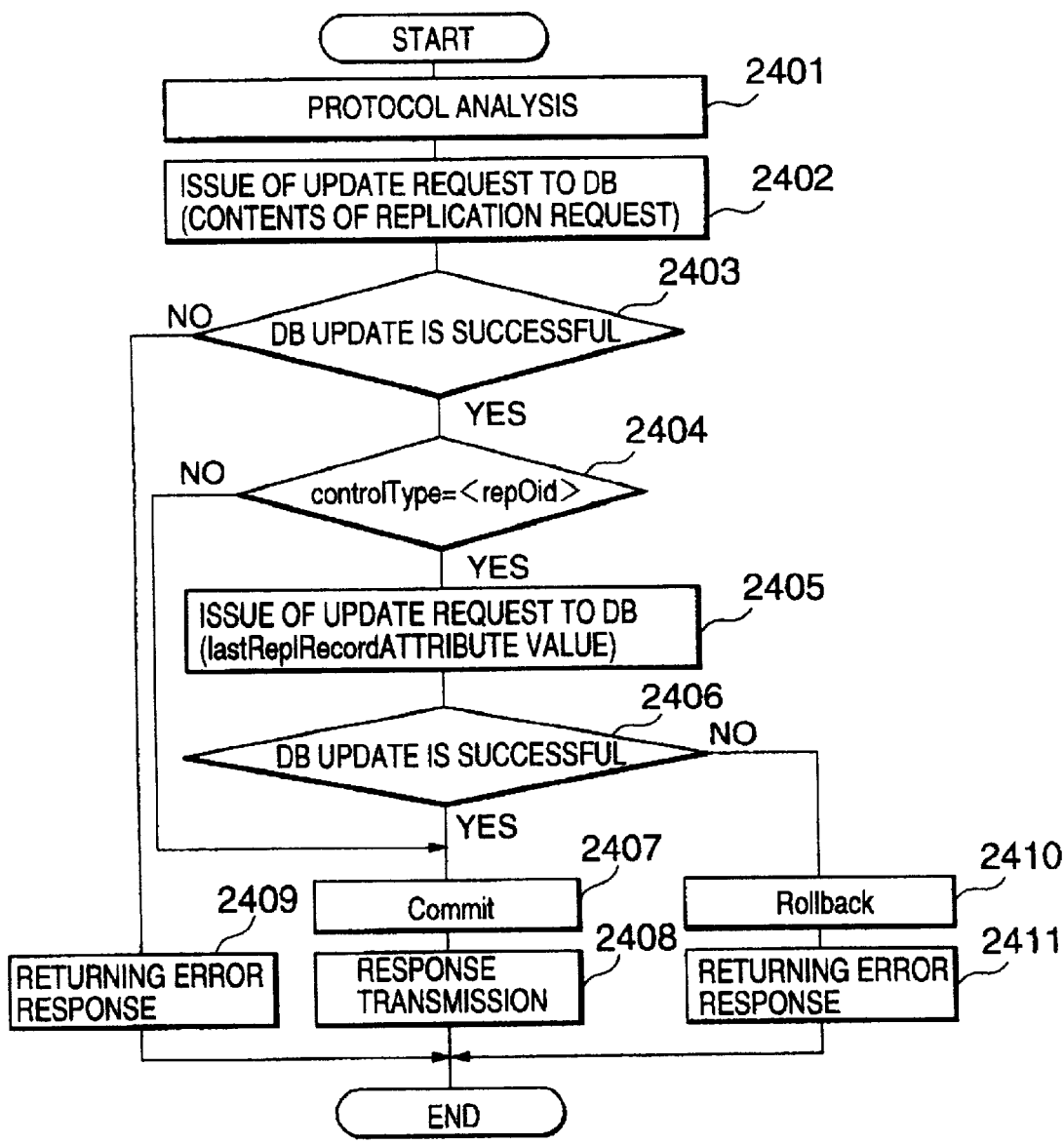
FIG. 24 is a flowchart showing a flow of partial processing from receipt of a replication request to return of response performed by a consumer directory server program.

FIG. 24 shows a partial flowchart from receipt of a replication request to return of response in the consumer directory server program 8c, for explaining an extension function in the third embodiment.

As shown in FIG. 24, on receiving a replication request, the consumer directory server program 8c analyzes this replication request (Step 2401).

Successively, the consumer directory server program 8c issues an update request based on the contents of the request to a database managing the replica data 9c so as to change the replica data 9c (Step 2402). Then, it judges if the modify operation is successful or not (Step 2403). In the case of failure, it returns an error response (Step 2409).

Further, in a case where the modify operation is successful (Step 2403), the consumer directory server program 8c confirms, as for the received replication request, if a value of controlType has the Control field which is an identifier indicating an extension function (Step 2404).

When the value of controlType does not have Control field as an identifier indicating an extension function, it proceeds to Step 2407. When the value of controlType has Control field as an identifier indicating an extension function, it changes the lastReplRecord attribute value expressing the replication record identifier 10c to the value of control value (Step 2405).

Further, when the modify operation is successful (Step 2406), the consumer directory server program 8c issues, to the database, a Commit request for effectuating all the modify operations performed up to that point in time and terminating the transaction (Step 2407). Lastly, it transmits a response indicating success (Step 2408), and ends the processing for the replication request received.

In a case where the modify operation ends in failure (Step 2406), it issues a Rollback request for nullifying all the modify operations performed up to that point of time and terminating the transaction (Step 2410), cancels the received replication request, and transmits an error response (Step 2411).

As described above, according to the third embodiment, in addition to the features of the first and second embodiments, the replication server program 10 uses Controls as an extension function of LDAP to add instructions to change the lastReplRecord attribute value to each replication request. Accordingly, it is not necessary to issue a lastReplRecord update request for requesting a change of the lastReplRecord attribute, in addition to a replication request, and an increase of network traffic is suppressed.

As described above, according to the present invention, information to specify the entry changed by the replication for the last time is recorded in the replica data managed by a directory server on the consumer side. Thus, based on this information, a server performing replication can know an entry on which the next replication is to be performed, and accordingly, can recognize the difference between the master data managed by the directory server on the supplier side and the replica data managed by the directory server on the consumer side.

Thus, by keeping a backup of the replica data, even if the replica data has been lost owing to, for example, physical damage to a recording medium, the directory server on the consumer side can reconstruct the replica data using the backup, without acquiring all the entries in the master data from the directory server on the supplier side, thus improving operability.

Further, according to the present invention, in the directory server on the consumer side, a program managing the replica data has a transaction function. Using this transaction function, an entry modify operation and a modify operation on information indicating that entry are processed in the same transaction. Accordingly, consistency of the replica data with information for specifying an entry changed for the last time in the replica data is assured.

Thus, even if the replication ends abnormally owing to unexpected problem at any point in time, it is possible to restart the replication normally after the recovery from the problem, which improves operability. Further, the administrator needs not worry about the extent to which the replication proceeded. Which reduces the burden on the administrator.

What is claimed is:

1. A replication method for keeping contents of master data and contents of replica data identical to each other in a directory system, in which, a first directory server manages the master data of directory data and records and holds replication log of operations in changing said master data; one or more second directory servers each manages its replica data as a replica of said master data; and said first directory server and said one or more second directory servers are capable of being connected through a network; wherein said replication method comprises: said first directory server acquires a replication log which becomes an object of processing out of the replication log recorded and held by said first directory server, and issues a replication request that requests performing, on said replica data, the same operations as operations corresponding to the acquired replication log to said second directory server;

said first directory server and the second directory server record an identifying information for specifying the replication log corresponding to said operations performed by said second directory server when said operation performed in accordance with said replication request is successful; and the identifying information recorded by said second directory server is referred to, so as to decide the replication log to be acquired, in acquiring the replication log which is to be a new object of processing from the replication log recorded and held by said first directory server.

2. The replication method according to claim 1, wherein said replication server issues a directory access request that requests performing an operation of searching said identifying information, to said second directory server, so as to refer to the identifying information recorded in the replica data managed by said second directory server.

3. The replication method according to claim 2, wherein: said replication server issues a directory access request that requests performing an operation of recording said identifying information, to said second directory server, so as to record said identifying information into the replica data managed by said second directory server.

4. The replication method according to claim 3, wherein: even when the operations performed by said second directory server in accordance with said replication request result in failure, said replication server judges the failure as success if the failure is caused by issuing the same replication request as the replication request successively more than once, and the second servers previously received the same replication request as the replication request.

5. The replication method according to claim 2, wherein: said second directory server performs a predefined specific operation in accordance with contents set into a predefined specific field within a directory access request received; and said replication server sets, into said specific field of said replication request, information necessary for said second directory server to perform a specific operation of recording said identifying information, so that said identifying information is recorded into the replica data managed by said second directory server.

6. The replication method according to claim 5, wherein: said second directory server performs an operation according to said replication request and an operation of recording said identifying information, in the same single transaction.

7. The replication method according to claim 6, wherein: said first directory server and said second directory server belong to one object class, and manage respectively entries constituting said master data and said replica data, as objects, each having one or more attributes; and said identifying information belongs to a specific object class defined in advance, and recorded into an entry managed as an object having a specific attribute defined in advance, as an attribute value of said specific attribute.

8. A replication method for maintaining contents of master data and contents of replica data in a directory system, in which, a first directory server manages the master data of directory data and maintains replication log of operations in changing said master data; a second directory server manages the replica data as a replica of said master data; and said first directory server and said second directory server are capable of being connected through a network; wherein said replication method comprises: said first directory server acquiring a replication log that becomes an object of processing from the replication log maintained by said first directory server, and issues a replication request that requests performing, on said replica data, the same operations as operations corresponding to the acquired replication log to said second directory server;

said first directory server and the second directory server record an identifying information for specifying the replication log corresponding to said operations performed by said second directory server; and the identifying information recorded by said second directory server is referred to in acquiring the replication log that is to be a new object of processing from the replication log recorded and held by said first directory server.

9. The replication method according to claim 8, wherein said replication server issues a directory access request that requests performing an operation of searching said identifying information, to said second directory server, so as to refer to the identifying information recorded in the replica data managed by said second directory server.

10. The replication method according to claim 9, wherein: said replication server issues a directory access request that requests performing an operation of recording said identifying information, to said second directory server, so as to record said identifying information into the replica data managed by said second directory server.

11. The replication method according to claim 10, wherein: even when the operations performed by said second directory server in accordance with said replication request result in failure, said replication server judges the failure as success if the failure is caused by issuing the same replication request as the replication request successively more than once, and the second servers previously received the same replication request as the replication request.

12. The replication method according to claim 9, wherein:

said second directory server performs a predefined specific operation in accordance with contents set into a predefined specific field within a directory access request received; and said replication server sets, into said specific field of said replication request, information necessary for said second directory server to perform a specific operation of recording said identifying information, so that said identifying information is recorded into the replica data managed by said second directory server.

13. The replication method according to claim 12, wherein: said second directory server performs an operation according to said replication request and an operation of recording said identifying information, in the same single transaction.

14. The replication method according to claim 13, wherein:

said first directory server and said second directory server belong to one object class, and manage respectively entries constituting said master data and said replica data, as objects, each having one or more attributes; and said identifying information belongs to a specific object class defines in advance, and recorded into an entry managed as an object having a specific attribute defined in advance, as an attribute value of said specific attribute.

* * * * *